United States Patent
Namerikawa et al.

[11] Patent Number: 6,089,090
[45] Date of Patent: Jul. 18, 2000

[54] VIBRATION GYRO SENSOR

[75] Inventors: Masahiko Namerikawa, Inazawa; Kazuyoshi Shibata, Mizunami; Yukihisa Takeuchi, Nishikamo-gun, all of Japan

[73] Assignee: NGK Insulators, Ltd., Nagoya, Japan

[21] Appl. No.: 08/944,899

[22] Filed: Oct. 6, 1997

[30] Foreign Application Priority Data

Oct. 15, 1996 [JP] Japan .................................. 8-272206

[51] Int. Cl.$^7$ ...................................................... G01P 9/04
[52] U.S. Cl. ......................................................... 73/504.13
[58] Field of Search ............................ 73/504.13, 504.12, 73/504.14; 310/321, 329

[56] References Cited

U.S. PATENT DOCUMENTS

| | | | |
|---|---|---|---|
| 4,644,793 | 2/1987 | Church | 73/504.13 |
| 5,218,867 | 6/1993 | Varnham et al. | |
| 5,226,321 | 7/1993 | Varnham et al. | 73/504.13 |
| 5,419,194 | 5/1995 | Varnham et al. | |
| 5,445,007 | 8/1995 | Varnham et al. | |
| 5,450,751 | 9/1995 | Putty et al. | |
| 5,476,007 | 12/1995 | Nakamura | 73/504.12 |
| 5,540,094 | 7/1996 | Varnham et al. | |
| 5,629,472 | 5/1997 | Varnham et al. | |

FOREIGN PATENT DOCUMENTS 0567340  10/1993  European Pat. Off. .

*Primary Examiner*—John E. Chapman
*Attorney, Agent, or Firm*—Wall Marjama Bilinski & Burr

[57] ABSTRACT

A vibration gyro sensor including a support having an approximately square planar contour with a central opening having an approximately circular planar configuration, an annular section arranged in the opening of the support and having an approximately circular planar contour for constructing a vibrator, and a plurality of resilient sections which span the inner circumference of the support and the outer circumfererence of the annular section. The support, the annular section, and the plurality of resilient sections constitute an integrated fired ceramic product. The vibration gyro sensor further includes piezoelectric/electrostrictive elements (driving piezoelectric/electrostrictive elements and detecting piezoelectric/electrostrictive elements) formed on upper surfaces of the respective resilient sections and/or thin-walled portions of the annular section. Each of the resilient sections has a thickness in its direction of height designed to be smaller than a thickness of thick-walled portions of the annular section. Both the thin-walled portions of the annular section and the resilient sections are thin-walled so that the rigidity in the direction of vibration of the piezoelectric/electrostrictive elements is lowered to give a large amplitude of vibration caused on the annular section (vibrator).

9 Claims, 27 Drawing Sheets

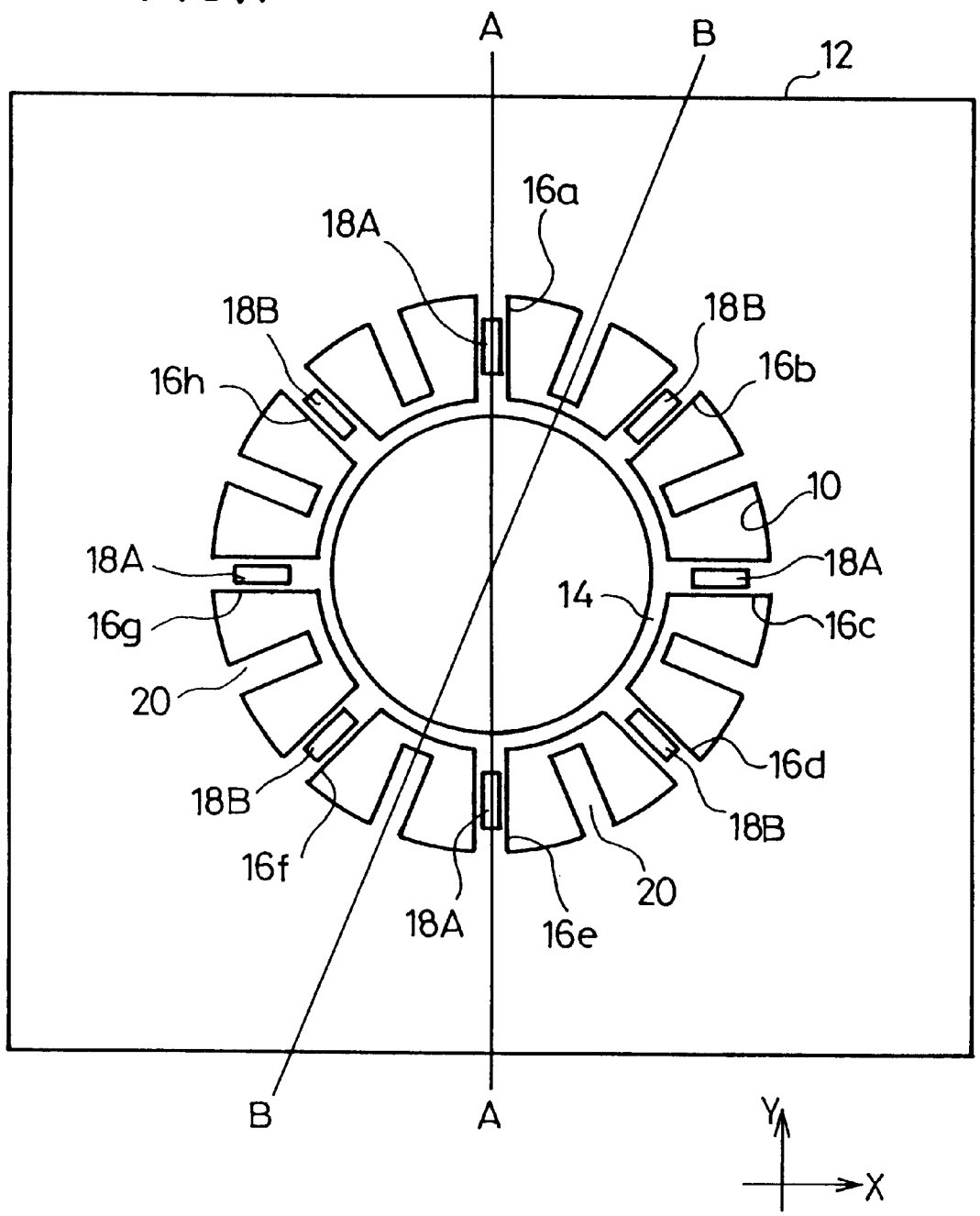

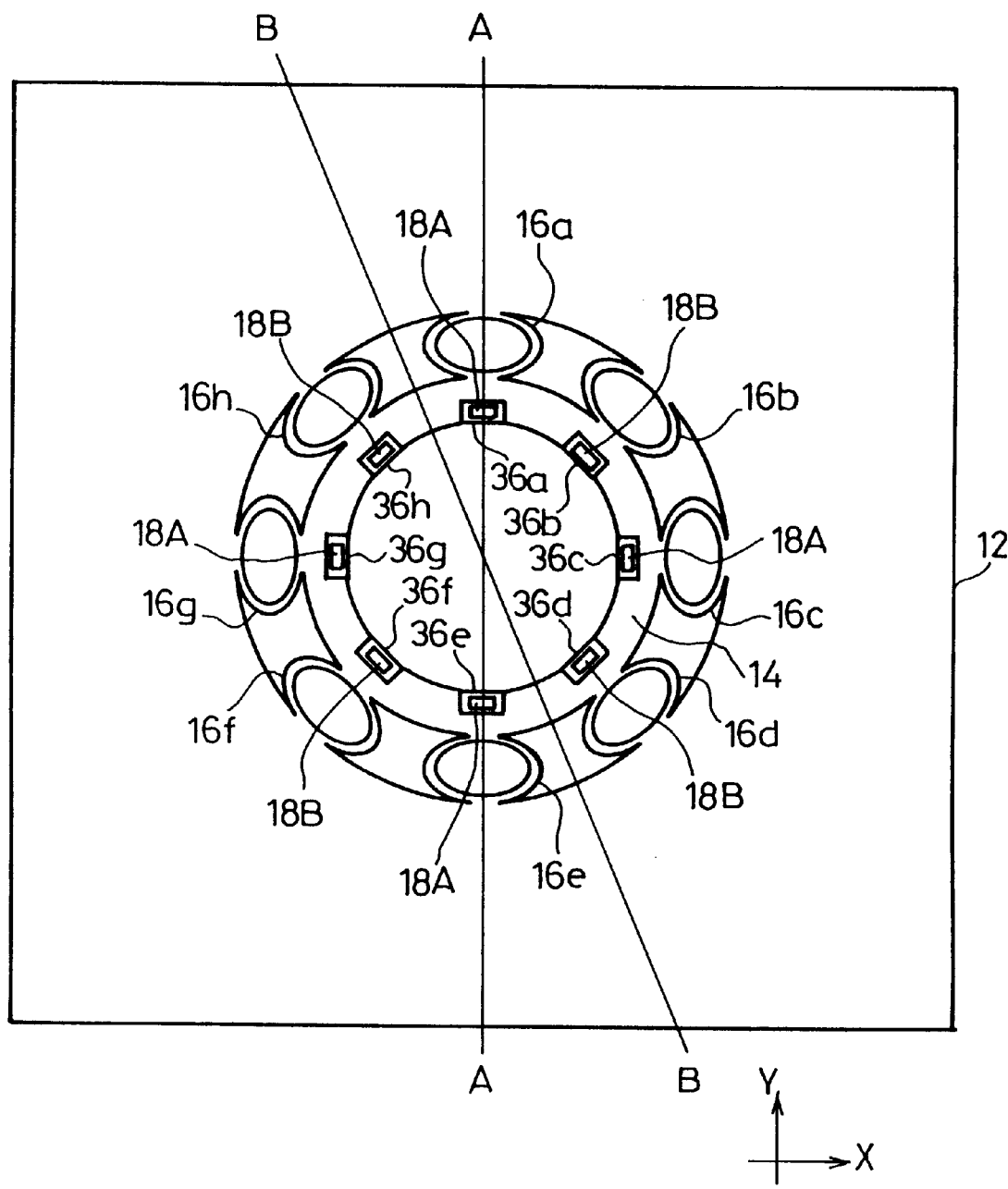

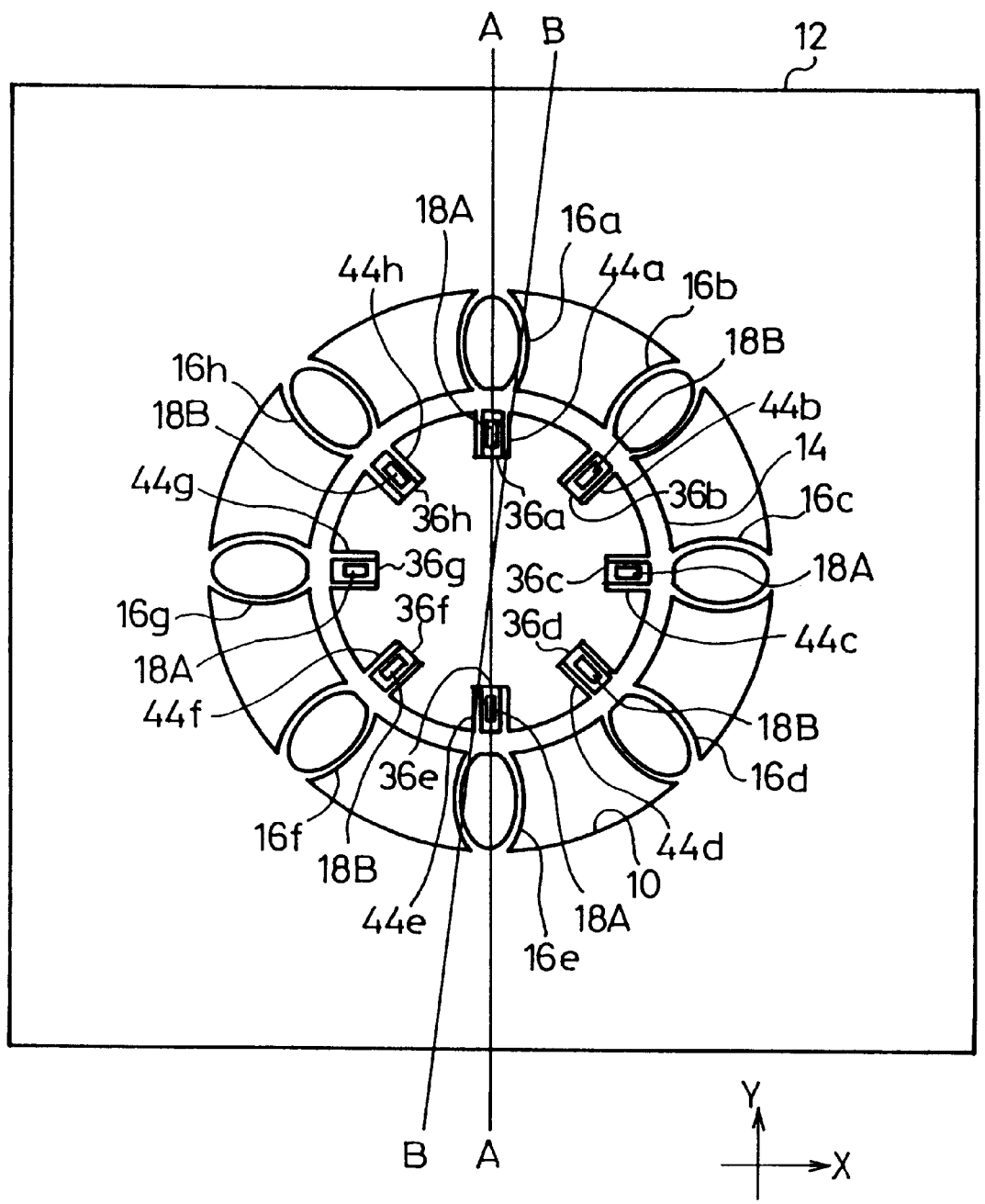

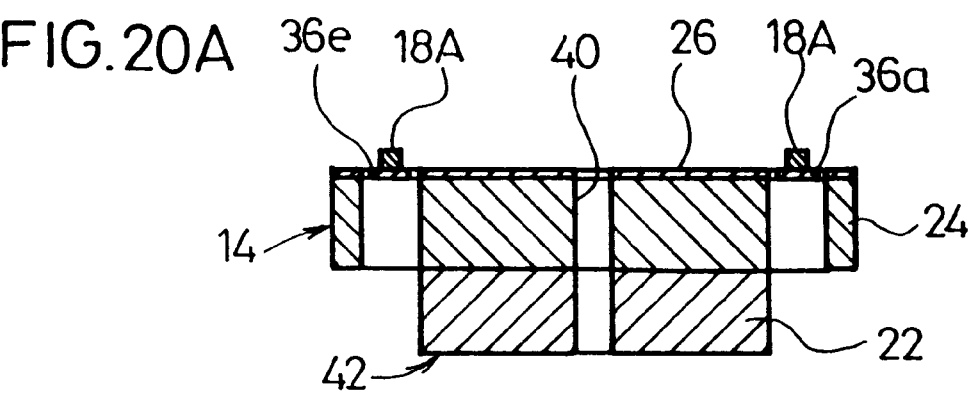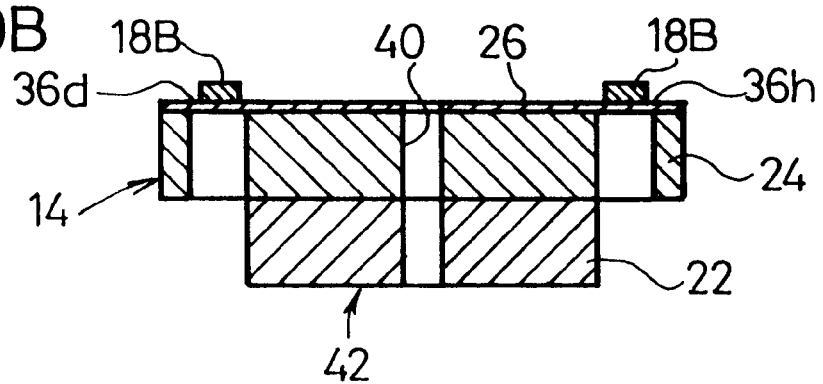

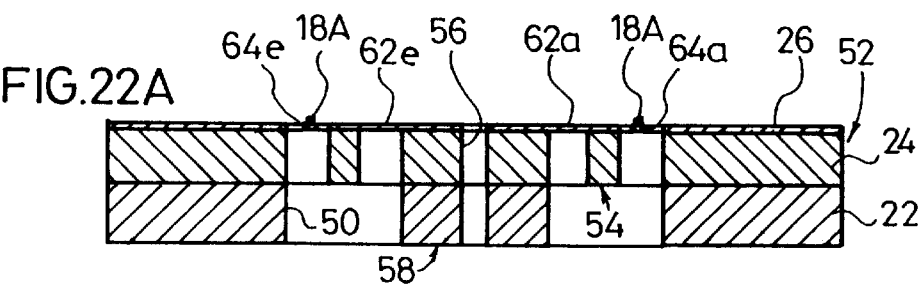
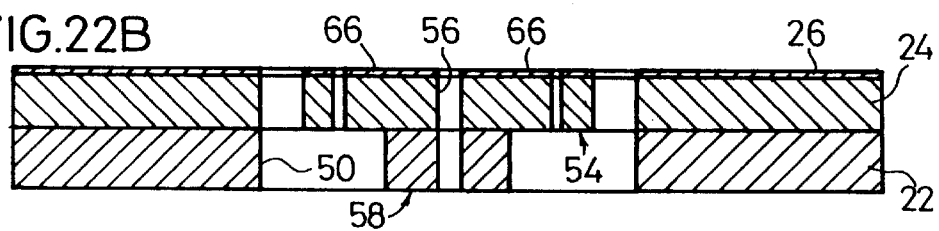
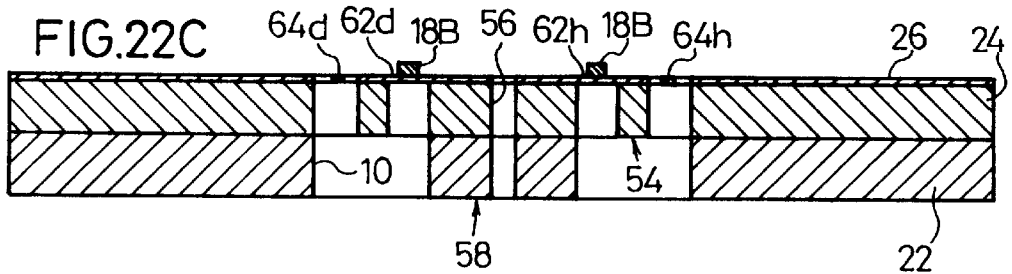

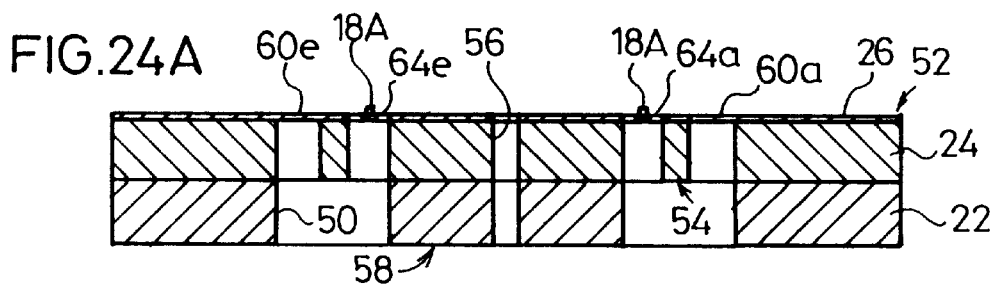
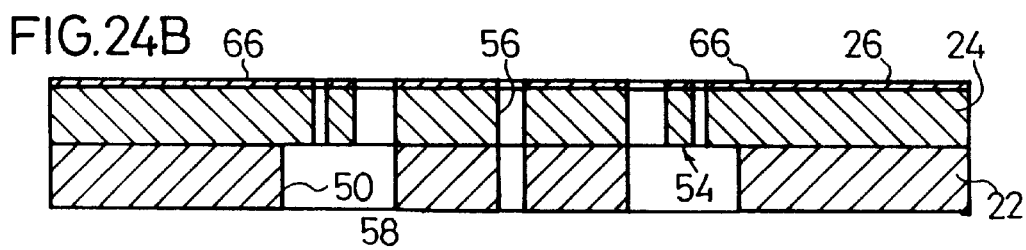
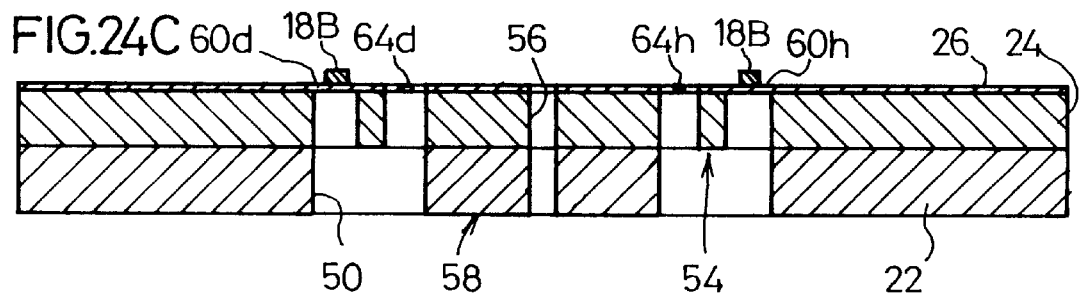

VIBRATION GYRO SENSOR

BACKGROUND OF THE INVENTION

1. Field of the Invention

The present invention relates to a vibration gyro sensor and a method for producing the same. In particular, the present invention relates to a vibration gyro sensor for detecting the angular velocity of rotation by utilizing the Coriolis force generated when a ring member (vibrator) vibrated with a driving piezoelectric/electrostrictive element is rotated while being vibrated.

2. Description of the Related Art

The gyro sensor, which is a sensor for detecting the angular velocity of rotation, has been hitherto used, for example, for inertial navigation systems of aircraft and shipping. Recently, the gyro sensor is used for vehicle-carried navigation systems and for attitude control systems of automatically guided robot vehicles. Further, the gyro sensor is also used, for example, for picture blurring-preventive systems of VTR cameras. In such circumstances, a compact type gyro sensor is required, which is appropriately used in various fields as described above. Accordingly, the vibration gyro sensor has attracted attention.

As well-known, the vibration gyro sensor of this type has a basic structure comprising a driving piezoelectric element and a detecting piezoelectric element which adhere to a vibrator formed of a constant resilience metal represented by an elinvar alloy. In a rectangular coordinate system of X, Y, Z axes, when the vibrator is rotated about the z axis while giving bending vibration in the x axis direction to the vibrator by using the driving piezoelectric element, the Coriolis force acts in the y axis direction to the vibrator. Accordingly, a strain or distortion is generated in the detecting piezoelectric element in accordance with bending vibration in the y axis direction caused in the vibrator by the Coriolis force. The strain is detected as a voltage (or as an electric charge). The angular velocity is determined on the basis of the detected voltage.

However, in the case of the conventional vibration gyro sensor as described above, the amount of displacement of the vibrator, which is based on the vibration induced by the driving piezoelectric element, is small. Therefore, the voltage (electromotive force), which is detected by the detecting piezoelectric element, is small. As a result, the conventional vibration gyro sensor involves a problem that the sensitivity is low.

In addition, the driving piezoelectric element and the detecting piezoelectric element are glued and fixed to the vibrator by using an adhesive. Therefore, the adhesive intervenes between the vibrator and the piezoelectric elements. As a result, the stress is absorbed by the adhesive. Due to this fact, together with other factors, if any, a problem arises in that the detection sensitivity is lowered.

When the vibrator comprises a member which is composed of a sound chip or a tuning fork formed of an elinvar alloy, a problem arises in that the characteristics of the vibrator tend to be affected by an ambient magnetic field, because the elinvar alloy is a ferromagnetic material. Further, due to the shape or the material of the vibrator as described above, there is an implicit problem that it is difficult to perform processing or machining when the resonance frequency of the vibrator is adjusted.

SUMMARY OF THE INVENTION

The present invention has been made taking such problems into consideration, an object of which is to provide a vibration gyro sensor made of ceramics wherein the characteristics of the vibrator are scarcely affected by an ambient magnetic field, processing or machining can be easily performed, and the electric characteristics and the mechanical characteristics can be advantageously adjusted, and a method for producing the vibration gyro sensor.

Another object of the present invention is to provide a vibration gyro sensor which is excellent in sensitivity in addition to the foregoing objective advantages, and a method for producing the vibration gyro sensor.

The above and other objects, features and advantages of the present invention will become more apparent from the following description when taken in conjunction with the accompanying drawings in which a preferred embodiment of the present invention is shown by way of illustrative example.

DESCRIPTION OF THE DRAWINGS

FIG. 1 shows a plan view illustrating a structure of a vibration gyro sensor according to a first embodiment.

FIG. 5 shows a plan view illustrating a structure of a vibration gyro sensor according to a second embodiment.

FIG. 9 shows a plan view illustrating a structure of a vibration gyro sensor according to a third embodiment.

FIG. 20A shows a cross-sectional view taken along a line A—A in FIG. 19.

FIG. 20B shows a cross-sectional view taken along a line B—B in FIG. 19.

FIG. 22A shows a cross-sectional view taken along a line A—A in FIG. 21.

FIG. 22B shows a cross-sectional view taken along a line B—B in FIG. 21.

FIG. 22C shows a cross-sectional view taken along a line C—C in FIG. 21.

FIG. 24A shows a cross-sectional view taken along a line A—A in FIG. 23.

FIG. 24B shows a cross-sectional view taken along a line B—B in FIG. 23.

FIG. 24C shows a cross-sectional view taken along a line C—C in FIG. 23.

DESCRIPTION OF THE PREFERRED EMBODIMENTS

Figure 2A:
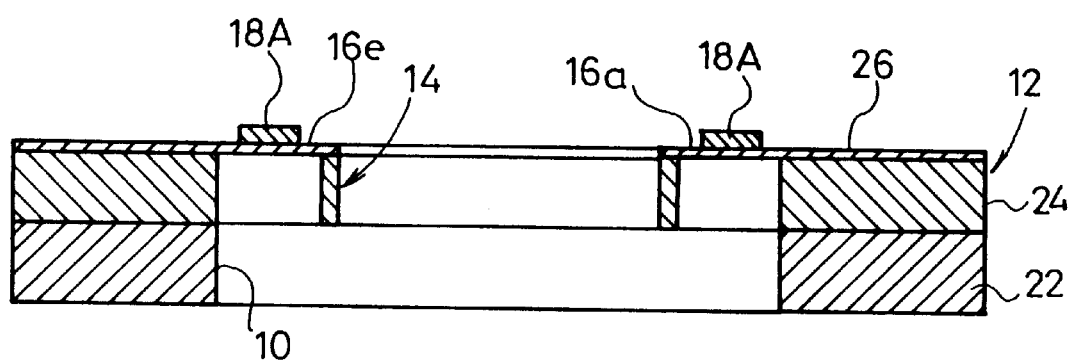
FIG. 2A shows a cross-sectional view taken along a line A—A in FIG. 1.

Several illustrative embodiments of the vibration gyro sensor according to the present invention will be described below with reference to FIGS. 1 to 30.

At first, as shown in FIG. 1, a vibration gyro sensor according to a first embodiment comprises an annular frame 12 having an approximately square planar contour with a central opening 10 having an approximately circular planar configuration, an annular section 14 arranged in the opening 10 of the annular frame 12 and having an approximately circular planar contour for constructing a vibrator, and a plurality of resilient sections 16 (16a to 16h) which span the inner circumference of the annular frame 12 and the outer circumference of the annular section 14, wherein the annular frame 12, the annular section 14, and the plurality of resilient sections 16 are constructed by an integrated fired product made of ceramics. The vibration gyro sensor further comprises piezoelectric/electrostrictive elements 18 (driving piezoelectric/electrostrictive elements 18A and detecting piezoelectric/electrostrictive elements 18B) formed on upper surfaces of the respective resilient sections 16a to 16h. The resilient sections 16a to 16h will be simply referred to as the resilient sections 16 when they are collectively described.

Each of the resilient sections 16 is formed to have a rectangular planar configuration, having a thickness in its direction of height designed to be smaller than a thickness of the annular section 14 which constructs the vibrator. Namely, each of the resilient sections 16 is thin-walled so that the rigidity in the direction of vibration of the piezoelectric/electrostrictive element 18 is lowered to give a large amplitude of vibration caused on the annular section 14 (vibrator).

In the illustrative embodiment shown in FIG. 1, the entire resilient sections 16 are thin-walled. However, only portions for forming the piezoelectric/electrostrictive elements 18 thereon may be thin-walled, and the other portions may be allowed to have the same thickness as that of the annular section 14. Therefore, in the following description, when the entire resilient section 16 is indicated, it is referred to as "resilient section", while when the portion of the resilient section 16, on which the piezoelectric/electrostrictive element 18 is formed, is indicated, it is referred to as "thin-walled region".

The plurality of resilient sections 16 (eight resilient sections 16a to 16h in the illustrative embodiment shown in FIG. 1) are arranged at positions at which they are separated from each other by equal spacing distances (distance to give a central angle of 45°) and they are mutually point-symmetrical.

The piezoelectric/electrostrictive elements 18, which are formed on the resilient sections 16, include the driving piezoelectric/electrostrictive elements 18A for vibrating the annular section 14 to serve as the vibrator, and the detecting piezoelectric/electrostrictive elements 18B for detecting the strain caused by vibration generated in a direction of 45° with respect to the direction of vibration of the annular section 14 when the annular section 14 is rotated about its axis as a center. In the vibration gyro sensor according to the first embodiment, the mutually adjacent resilient sections 16 are divided into two groups. One group of the resilient sections 16 are used, for example, to form the driving piezoelectric/electrostrictive elements 18A thereon, and the other group of the resilient sections 16 are used to form the detecting piezoelectric/electrostrictive elements 18B. In the illustrative embodiment shown in FIG. 1, the driving piezoelectric/electrostrictive elements 18A are formed on the four resilient sections 16a, 16c, 16e, 16g arranged in directions along the X and Y axes respectively, and the detecting piezoelectric/electrostrictive elements 18B are formed on the other four resilient sections 16b, 16d, 16f, 16h respectively.

Inwardly protruding projections 20 are provided in an integrated manner on the inner circumference of the annular frame 12 between the mutually adjacent resilient sections 16. The projections 20 are consequently formed when connecting sections are cut and removed at outer circumferential portions of the annular section 14, the connecting sections having been provided in order to position the annular section 14 at a prescribed position in the opening 10 of the annular frame 12 at the stage of production of the vibration gyro sensor as described later on. Therefore, the projections 20 may be omitted or removed at the stage in which the vibration gyro sensor has been assembled.

Figure 2B:
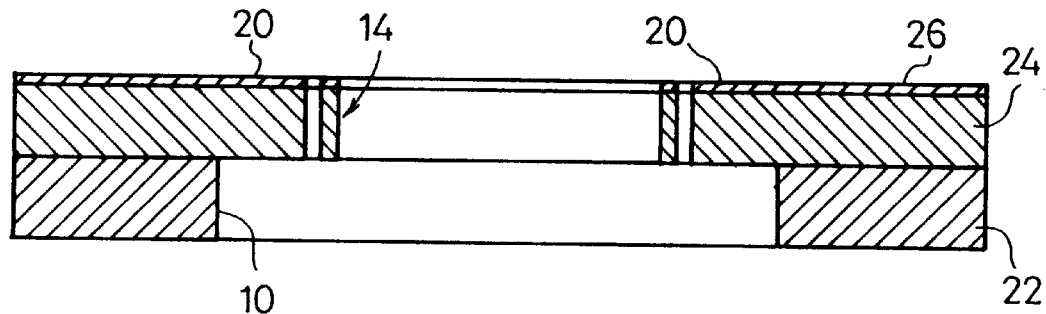
FIG. 2B shows a cross-sectional view taken along a line B—B in FIG. 1.

As shown in FIG. 2, the vibration gyro sensor, which is constructed by the integrated fired product of ceramics as described above, may be grasped as an integrated stacked product comprising a spacer layer 22 as a lowermost layer, a substrate layer 24 as an intermediate layer, and a thin plate layer 26 as an uppermost layer. Namely, the thin-walled resilient section 16 is given by the thin plate layer 26, the annular section 14 and the projections 20 are given by integrating and stacking the thin plate layer 26 and the substrate layer 24, and the annular frame 12 is given by integrating and stacking the thin plate layer 26, the substrate layer 24, and the spacer layer 22.

Figure 3:
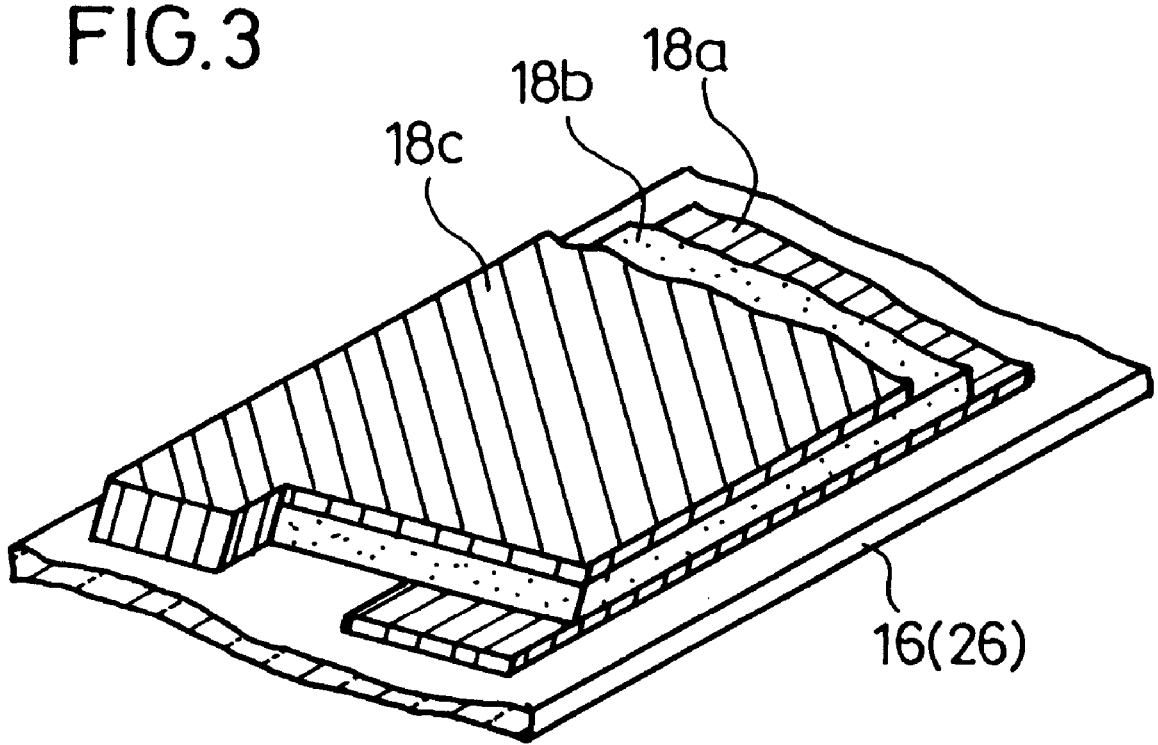
FIG. 3 shows a perspective view, with partial cutaway, illustrating a structure of a piezoelectric/electrostrictive element based on the use of the lateral effect of the electric field-induced strain.

The piezoelectric/electrostrictive element 18 is directly formed on the resilient section 16 (thin plate layer 26) in a state in which a thin film lower electrode 18a, a piezoelectric/electrostrictive film 18b, and an upper electrode 18c are stacked and integrated into one unit as shown in FIG. 3.

When an electric power is applied to the driving piezoelectric/electrostrictive elements 18A of the vibration gyro sensor according to the first embodiment constructed as described above to operate the driving piezoelectric/electrostrictive elements 18A, the operation causes the annular section 14 to make deformation vibration in an alternating manner to form, for example, an ellipse having its major axis parallel to the X axis and an ellipse having its major axis parallel to the Y axis.

When an angular velocity is applied around the axis of the annular section 14 in a state in which the annular section 14 is vibrated as described above, a force directed in a certain direction (Coriolis force) is generated in the annular section 14 in an alternating manner in accordance with the vibration. As a result, the force acts in the certain direction on the regions 16b, 16d, 16f, 16h (detecting regions) formed with the detecting piezoelectric/electrostrictive elements 18B, of the resilient sections 16a to 16h. The force causes the detecting regions 16b, 16d, 16f, 16h to make vibration. The vibration is detected as an electromotive force (voltage) by the detecting piezoelectric/electrostrictive elements 18B disposed on the detecting regions 16b, 16d, 16f, 16h.

As described above, the vibration gyro sensor according to the first embodiment includes the annular frame 12, the annular section 14 (vibrator), and the resilient sections 16 all of which are constructed by using the integrated fired product made of ceramics. Therefore, there is no magnetic material such as the conventional elinvar alloy in the materials for constructing the vibration gyro sensor. As a result, the characteristics of the sensor are not affected by any ambient magnetic field.

The portions, on which the piezoelectric/electrostrictive elements 18A, 18B are formed, are constructed by the thin-walled regions 16 which are thin-walled in their direction of height to give the structure having low rigidity. Accordingly, large strain is obtained at the detecting regions 16b, 16d, 16f, 16h, and the detection sensitivity on the detecting piezoelectric/electrostrictive elements 18B is greatly improved.

The vibration gyro sensor has the structure to measure the angular velocity about the axis of the annular section 14 which constructs the vibrator. Therefore, the annular section 14 (vibrator), the annular frame 12, and the resilient sections 16 can be made thin in their direction of height. Thus it is possible to facilitate realization of a compact size and a light weight of the sensor.

Next, a modified embodiment of the vibration gyro sensor according to the first embodiment will be explained with reference to FIG. 4. Components or parts corresponding to those shown in FIG. 1 are designated by the same reference numerals, duplicate explanation of which will be omitted.

Figure 4:
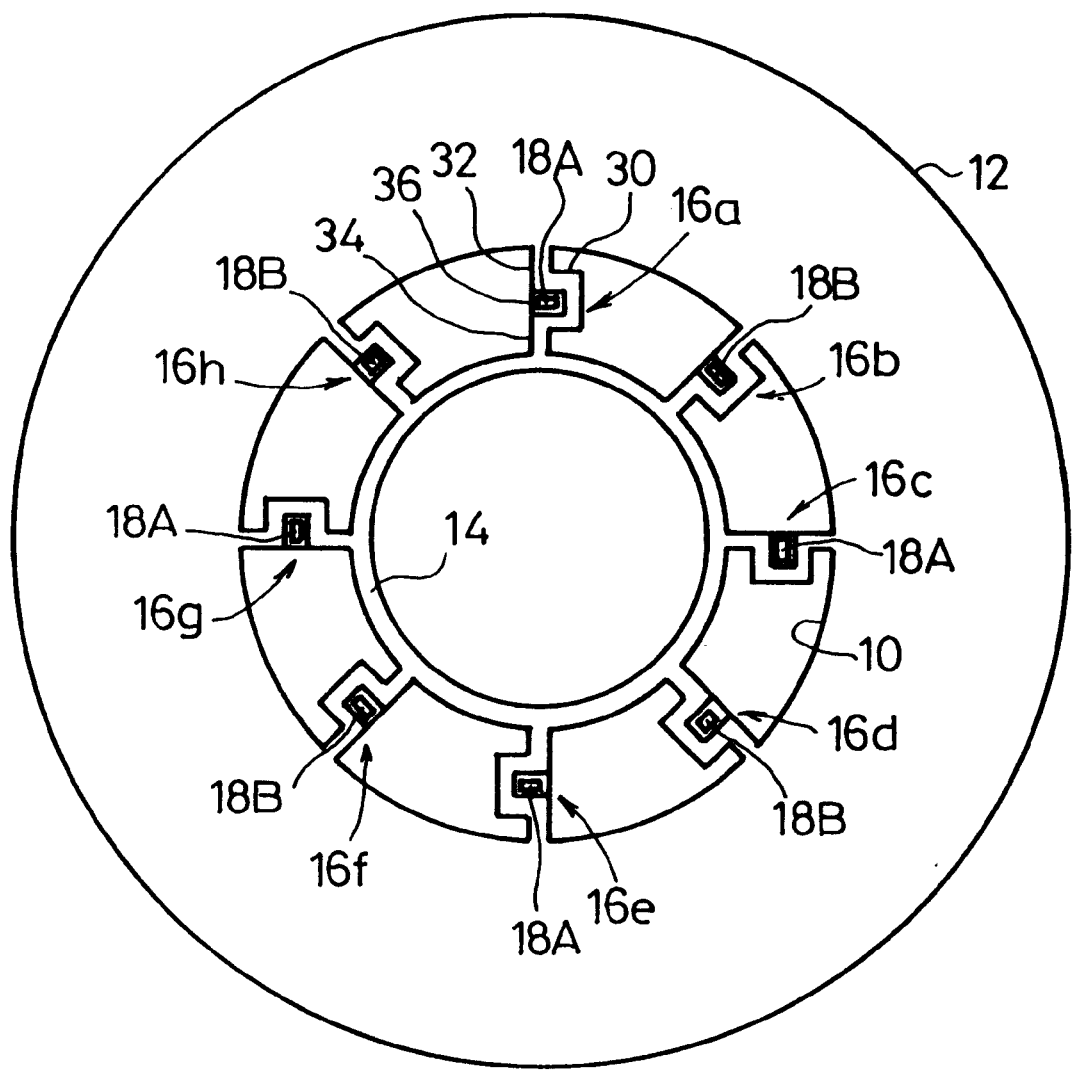
FIG. 4 shows a structure of a modified embodiment of the vibration gyro sensor according to the first embodiment.

As shown in FIG. 4, a vibration gyro sensor according to this modified embodiment has approximately the same structure as that of the vibration gyro sensor according to the first embodiment. However, the former is different from the latter in that the annular frame 12 has an approximately circular planar configuration, and in that the resilient sections 16 has the following configuration.

Namely, each of the resilient sections 16a to 16h is formed to comprise, in an integrated manner, an element-forming region 30 for forming the piezoelectric/electrostrictive element 18 thereon, an outer connecting region 32 for connecting the element-forming region 30 and the annular frame 12, and an inner connecting region 34 for connecting the element-forming region 30 and the annular section 14.

The outer connecting region 32 has the same width as that of the inner connecting region 34. The width is set to be smaller than a width of the element-forming region 30 to provide a structure having low rigidity. A portion of the element-forming region 30, on which the piezoelectric/electrostrictive element 18 is formed, has a thickness in its direction of height designed to be smaller than those of other portions to give a thin-walled region 36.

The vibration gyro sensor according to the modified embodiment has the same advantage as that of the vibration gyro sensor according to the first embodiment. Namely, the characteristics of the sensor are not affected by an ambient magnetic field, the detection sensitivity on the detecting piezoelectric/electrostrictive element 18B is greatly improved, and it is possible to facilitate realization of a compact size and a light weight of the sensor.

Next, a vibration gyro sensor according to a second embodiment will be explained with reference to FIGS. 5 and 6. Components or parts corresponding to those shown in FIGS. 1 and 2 are designated by the same reference numerals, duplicate explanation of which will be omitted.

As shown in FIG. 5, the vibration gyro sensor according to the second embodiment has approximately the same structure as that of the vibration gyro sensor according to the first embodiment. However, the former is different from the latter in the following points.

Namely, each of the resilient sections 16a to 16h is composed of a ring section having an approximately elliptic planar configuration with its minor axis directed in a radial direction on the basis of the center of the annular section 14. Each of the resilient sections 16a to 16h has a thickness in a direction of height, the thickness being designed to be approximately the same as a thickness of the annular section 14. Piezoelectric/electrostrictive elements 18 are formed at predetermined positions on the annular section 14.

The respective resilient sections 16a to 16h are arranged at positions at which they are separated from each other by equal spacing distances (distance to give a central angle of 45°) and they are mutually point-symmetrical, in the same manner as the vibration gyro sensor according to the first embodiment. In the illustrative embodiment shown in FIG. 5, the eight resilient sections 16a to 16h are exemplarily arranged and separated from each other by equal spacing distances.

Predetermined portions of the annular section 14, which contact with the inner circumference thereof, are used as regions for forming the piezoelectric/electrostrictive elements 18 thereon. The regions are provided as thin-walled regions 36 (36a to 36h) each having a thickness in a direction of height designed to be smaller than the thickness of the annular section 14. Namely, the portions of the annular section 14, on which the piezoelectric/electrostrictive elements 18 are formed, are thin-walled so that the rigidity in the direction of vibration of the piezoelectric/electrostrictive elements 18 is lowered. The thin-walled regions 36 (36a to 36h) are provided as eight individuals corresponding to the resilient sections 16a to 16h, and they are arranged at positions at which they are separated from each other by equal spacing distances (distance to give a central angle of 45°) and they are mutually point-symmetrical. When the thin-walled regions 36a to 36h are collectively referred to, they are simply described as the thin-walled regions 36.

The piezoelectric/electrostrictive elements 18, which are formed on the respective thin-walled regions 36, include driving piezoelectric/electrostrictive elements 18A for vibrating the annular section 14, and detecting piezoelectric/electrostrictive elements 18B for detecting the strain caused by vibration generated in a direction of 45° with respect to the direction of vibration of the annular section 14 when the annular section 14 is rotated about its axis as a center, in the same manner as the vibration gyro sensor according to the first embodiment. As for the mutually adjacent thin-walled regions 36, the driving piezoelectric/electrostrictive elements 18A are formed, for example, on one group of the thin-walled sections 36, and the detecting piezoelectric/electrostrictive elements 18B are formed on the other group of the thin-walled regions 36.

In the illustrative embodiment shown in FIG. 5, the driving piezoelectric/electrostrictive elements 18A are formed on the four thin-walled sections 36a, 36c, 36e, 36g arranged in directions along the X and Y axes respectively, and the detecting piezoelectric/electrostrictive elements 18B are formed on the other four thin-walled regions 36b, 36d, 36f, 36h.

Figure 6A:
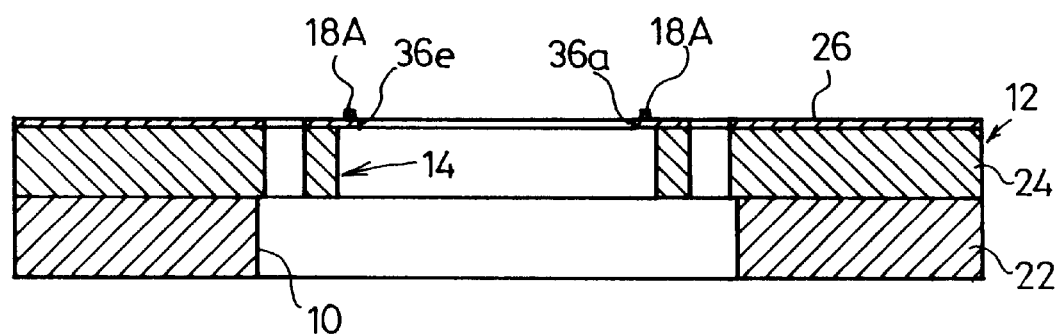
FIG. 6A shows a cross-sectional view taken along a line A—A in FIG. 5.
Figure 6B:
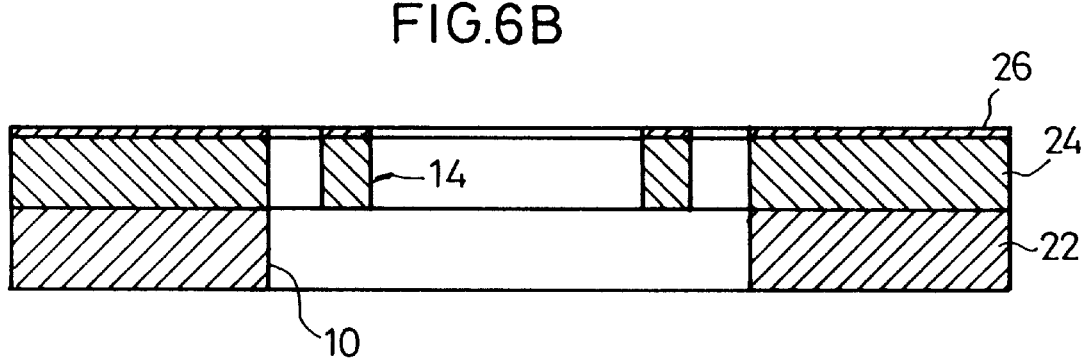
FIG. 6B shows a cross-sectional view taken along a line B—B in FIG. 5.

As shown in FIG. 6, the vibration gyro sensor according to the second embodiment may be also grasped as an integrated stacked product comprising a spacer layer 22 as a lowermost layer, a substrate layer 24 as an intermediate layer, and a thin plate layer 26 as an uppermost layer, in the same manner as the vibration gyro sensor according to the first embodiment. The thin-walled regions 36a to 36h of the annular section 14 are given by the thin plate layer 26, the annular section 14 (except for the thin-walled regions 36a to 36h) and the resilient sections 16a to 16h are given by integrating and stacking the thin plate layer 26 and the substrate layer 24, and the annular frame 12 is given by integrating and stacking the thin plate layer 26, the substrate layer 24, and the spacer layer 22.

Each of the piezoelectric/electrostrictive elements 18 is directly formed on the thin-walled region 36 (thin plate layer 26) of the annular section 14 in a state in which a thin film lower electrode 18a, a piezoelectric/electrostrictive film 18b, and an upper electrode 18c are stacked and integrated, in the same manner as the vibration gyro sensor according to the first embodiment.

When an electric power is applied to the driving piezoelectric/electrostrictive elements 18A on the thin-walled regions 36a, 36c, 36e, 36g of the vibration gyro sensor according to the second embodiment constructed as described above to operate the driving piezoelectric/electrostrictive elements 18A, the operation causes the annular section 14 to make deformation vibration in an alternating manner to form, for example, an ellipse having its major axis parallel to the X axis and an ellipse having its major axis parallel to the Y axis.

When an angular velocity is applied around the axis of the annular section 14 in a state in which the annular section 14 is vibrated as described above, a force directed in a certain direction (Coriolis force) is generated in the annular section 14 in an alternating manner in accordance with the vibration. As a result, the force acts in the certain direction on the regions 36b, 36d, 36f, 36h (detecting regions) formed with the detecting piezoelectric/electrostrictive elements 18B, of the thin-walled regions (36a to 36h) of the annular section 14. The force causes the detecting regions 36b, 36d, 36f, 36h to make vibration. The vibration is detected as an electromotive force (voltage) by the detecting piezoelectric/electrostrictive elements 18B disposed on the detecting regions 36b, 36d, 36f, 36h.

As described above, the vibration gyro sensor according to the second embodiment includes the annular frame 12, the annular section 14 (vibrator), and the resilient sections 16a to 16h all of which are constructed by using the integrated fired product made of ceramics. Therefore, there is no magnetic material such as the conventional elinvar alloy in the materials for constructing the vibration gyro sensor. As a result, the characteristics of the sensor are not affected by any ambient magnetic field.

The portions of the annular section 14, on which the piezoelectric/electrostrictive elements 18 are formed, are constructed by the thin-walled regions 36 which are thin-walled in their direction of height to give the structure having low rigidity. Accordingly, large strain is obtained at the detecting regions 36b, 36d, 36f, 36h, and the detection sensitivity on the detecting piezoelectric/electrostrictive elements 18B is greatly improved.

The vibration gyro sensor has the structure to measure the angular velocity about the axis of the annular section 14 which constructs the vibrator. Therefore, the annular section 14 (vibrator), the annular frame 12, and the resilient sections 16a to 16h can be made thin in their direction of height. Thus it is possible to facilitate realization of a compact size and a light weight of the sensor.

Especially, the vibration gyro sensor according to the second embodiment includes the resilient sections 16a to 16h each constructed as the ring section having the approximately elliptic planar contour. Accordingly, the minute vibration, which is generated on the thin-walled regions 36a, 36c, 36e, 36g of the annular section 14, can be transmitted to the entire annular section 14 with high following performance. Thus it is possible to greatly improve the amplitude of vibration of the annular section 14 caused by operating the driving piezoelectric/electrostrictive elements 18A.

Next, a modified embodiment of the vibration gyro sensor according to the second embodiment will be explained with reference to FIGS. 7 and 8. Components or parts corresponding to those shown in FIGS. 5 and 6 are designated by the same reference numerals, duplicate explanation of which will be omitted.

Figure 7:
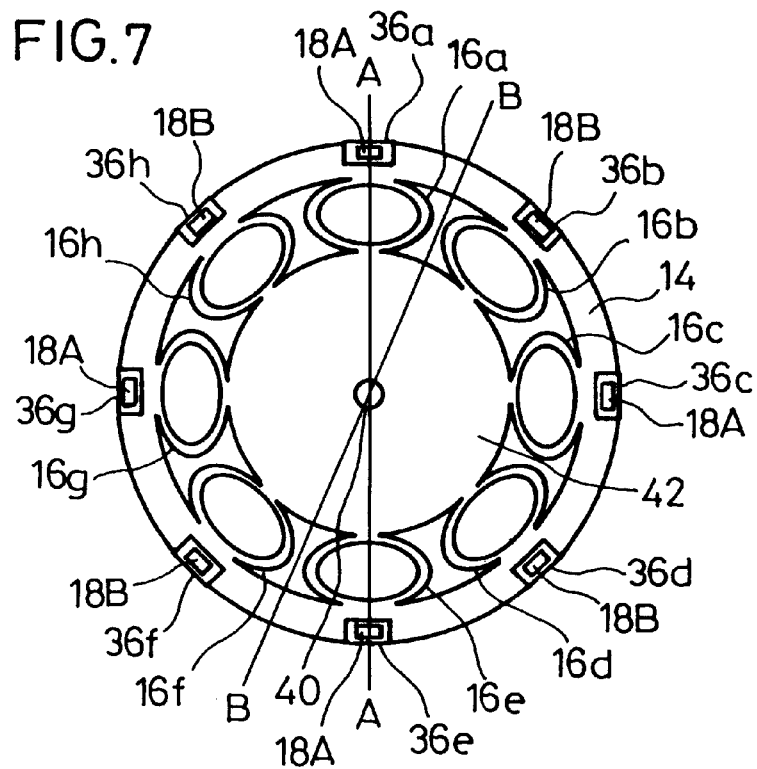
FIG. 7 shows a structure of a modified embodiment of the vibration gyro sensor according to the second embodiment.

As shown in FIG. 7, a vibration gyro sensor according to this modified embodiment has approximately the same structure as that of the vibration gyro sensor according to the second embodiment. However, the former is different from the latter in that in place of the annular frame 12, a support section 42 is constructed by an integrated fired product of ceramics together with the resilient sections 16a to 16h and the annular section 14, the support section 42 having an outer diameter smaller than an inner diameter of the annular section 14, and having a central hole 40, and in that the eight resilient sections 16a to 16h are equivalently arranged between the inner circumference of the annular section 14 and the outer circumference of the support section 42.

Predetermined portions of the annular section 14, which contact with the outer circumference, are used as regions for forming piezoelectric/electrostrictive elements 18 thereon. Each of the regions has a thickness in its direction of height which is designed to be smaller than a thickness of the annular section 14 to provide the thin-walled regions 36 (36a to 36h), in the same manner as the second embodiment described above.

Figure 8A:
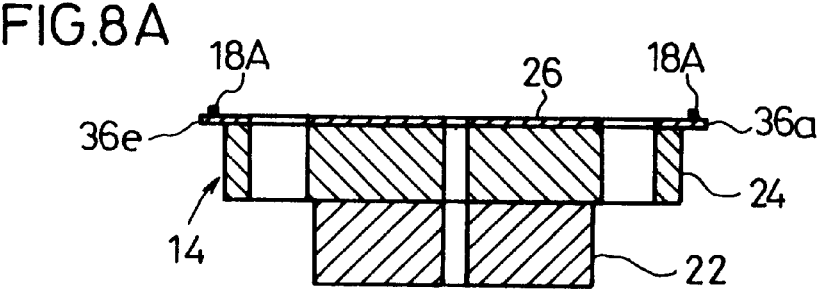
FIG. 8A shows a cross-sectional view taken along a line A—A in FIG. 7.
Figure 8B:
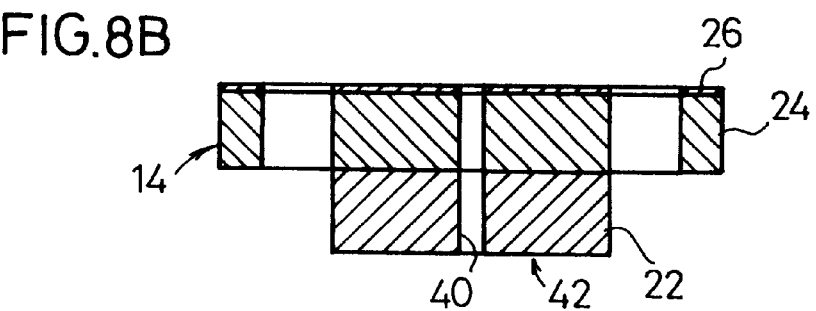
FIG. 8B shows a cross-sectional view taken along a line B—B in FIG. 7.

As shown in FIG. 8, the vibration gyro sensor according to the modified embodiment may be also grasped as an integrated stacked product comprising a spacer layer 22 as a lowermost layer, a substrate layer 24 as an intermediate layer, and a thin plate layer 26 as an uppermost layer, in the same manner as the vibration gyro sensor according to the second embodiment. The thin-walled regions 36a to 36h of the annular section 14 are given by the thin plate layer 26, the annular section 14 (except for the thin-walled regions 36a to 36h) and the resilient sections 16a to 16h are given by integrating and stacking the thin plate layer 26 and the substrate layer 24, and the support section 42 is given by integrating and stacking the thin plate layer 26, the substrate layer 24, and the spacer layer 22.

The vibration gyro sensor according to the modified embodiment has the same advantages as those provided by the vibration gyro sensor according to the second embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor.

Especially, each of the resilient sections 16a to 16h is constructed as the ring section having the approximately elliptic planar contour. Accordingly, the minute vibration, which is generated on the thin-walled regions 36a, 36c, 36e, 36g of the annular section 14, can be transmitted to the entire annular section 14 with high following performance. Thus it is possible to greatly improve the amplitude of vibration of the annular section 14 caused by operating the driving piezoelectric/electrostrictive elements 18A.

Next, a vibration gyro sensor according to a third embodiment will be explained with reference to FIGS. 9 and 10. Components or parts corresponding to those shown in FIGS. 5 and 6 are designated by the same reference numerals, duplicate explanation of which will be omitted.

As shown in FIG. 9, the vibration gyro sensor according to the third embodiment has approximately the same structure as that of the vibration gyro sensor according to the second embodiment. However, the former is different from the latter in the following points.

Namely, eight projections 44a to 44h, which protrude toward the center of the annular section 14, are formed on the inner circumference of the annular section 14 in an integrated manner. Each of the resilient sections 16a to 16h is composed of a ring section having an approximately elliptic planar configuration with its major axis directed in a radial direction on the basis of the center of the annular section 14. Piezoelectric/electrostrictive elements 18 are formed on the respective projections 44a to 44h.

Each of the projections 44a to 44h has an approximately rectangular planar configuration, with a thickness in its direction of height which is approximately the same as the thickness of the annular section 14. However, the thickness in the direction of height at the portion for forming the piezoelectric/electrostrictive element 18 is designed to be smaller than the thickness of the annular section 14. Namely, the portion of each of the projections 44a to 44h, on which the piezoelectric/electrostrictive element 18 is formed, is thin-walled (thin-walled regions 36a to 36h) so that the rigidity in the direction of vibration of the piezoelectric/electrostrictive element 18 is lowered, and the amplitude of vibration is large at the annular section 14 (vibrator).

The projections 44a to 44h are provided as eight individuals corresponding to the resilient sections 16a to 16h, and they are disposed at positions at which they are separated from each other by equal spacing distances (distance to give a central angle of 45°) and they are mutually point-symmetrical.

In the illustrative embodiment shown in FIG. 9, the driving piezoelectric/electrostrictive elements 18A are formed on the respective thin-walled regions 36a, 36c, 36e, 36g of the four projections 44a, 44c, 44e, 44g arranged in directions along the X and Y axes respectively, and the detecting piezoelectric/electrostrictive elements 18B are formed on the respective thin-walled regions 36b, 36d, 36f, 36h of the other four projections 44b, 44d, 44f, 44h.

Figure 10A:
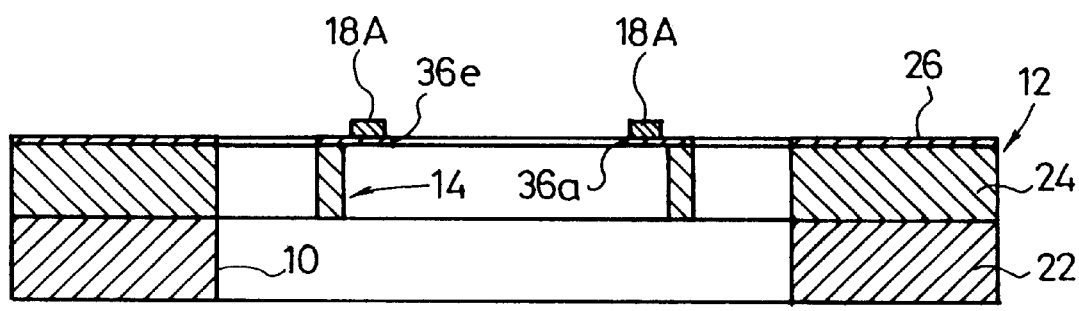
FIG. 10A shows a cross-sectional view taken along a line A—A in FIG. 9.
Figure 10B:
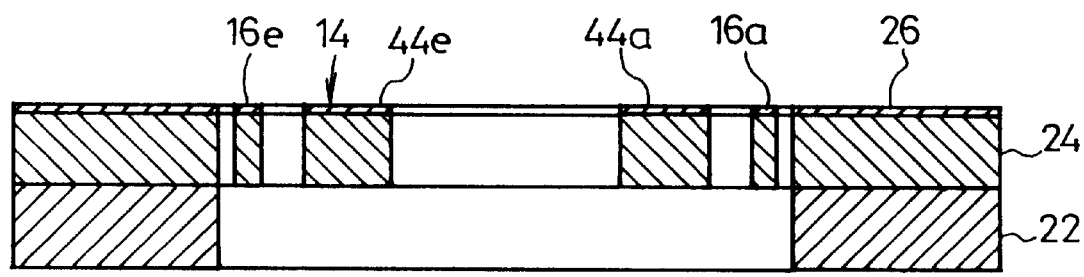
FIG. 10B shows a cross-sectional view taken along a line B—B in FIG. 9.

As shown in FIG. 10, the vibration gyro sensor according to the third embodiment may be also grasped as an integrated stacked product comprising a spacer layer 22 as a lowermost layer, a substrate layer 24 as an intermediate layer, and a thin plate layer 26 as an uppermost layer, in the same manner as the vibration gyro sensor according to the second embodiment. The thin-walled regions 36a to 36h of the projections 44a to 44h are given by the thin plate layer 26, the annular section 14, the projections 44a to 44h (except for the thin-walled regions 36a to 36h), and the resilient sections 16a to 16h are given by integrating and stacking the thin plate layer 26 and the substrate layer 24, and the annular frame 12 is given by integrating and stacking the thin plate layer 26, the substrate layer 24, and the spacer layer 22.

Each of the piezoelectric/electrostrictive elements 18 is directly formed on the thin-walled region 36 (thin plate layer 26) of the projection 44 in a state in which a thin film lower electrode 18a, a piezoelectric/electrostrictive film 18b, and an upper electrode 18c are stacked and integrated, in the same manner as the vibration gyro sensor according to the first embodiment.

The vibration gyro sensor according to the third embodiment has the same advantages as those provided by the vibration gyro sensor according to the second embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor.

Especially, each of the resilient sections 16a to 16h is constructed as the ring section having the approximately elliptic planar contour. Accordingly, the minute vibration, which is generated on the thin-walled regions 36a, 36c, 36e, 36g of the annular section 14, can be transmitted to the entire annular section 14 with high following performance. Thus it is possible to greatly improve the amplitude of vibration of the annular section 14 caused by operating the driving piezoelectric/electrostrictive elements 18A.

Next, a modified embodiment of the vibration gyro sensor according to the third embodiment will be explained with reference to FIGS. 11 and 12. Components or parts corresponding to those shown in FIGS. 9 and 10 are designated by the same reference numerals, duplicate explanation of which will be omitted.

Figure 11:
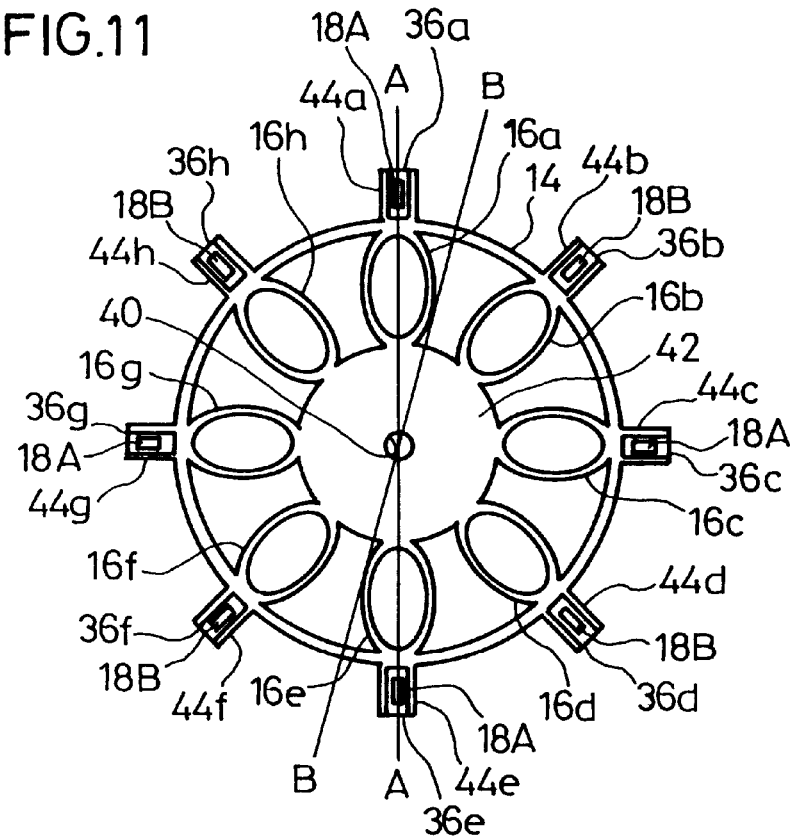
FIG. 11 shows a structure of a modified embodiment of the vibration gyro sensor according to the third embodiment.

As shown in FIG. 11, a vibration gyro sensor according to this modified embodiment has approximately the same structure as that of the vibration gyro sensor according to the third embodiment. However, the former is different from the latter in that in place of the annular frame 12, a support section 42 is constructed by an integrated fired product of ceramics together with the resilient sections 16*a* to 16*h* and the annular section 14, the support section 42 having an outer diameter smaller than an inner diameter of the annular section 14, and having a central hole 40, in that the eight resilient sections 16*a* to 16*h* are equivalently arranged between the inner circumference of the annular section 14 and the outer circumference of the support section 42, and in that eight projections 44*a* to 44*h* are formed so that they protrude outwardly from the outer circumference of the annular section 14.

Figure 12A:
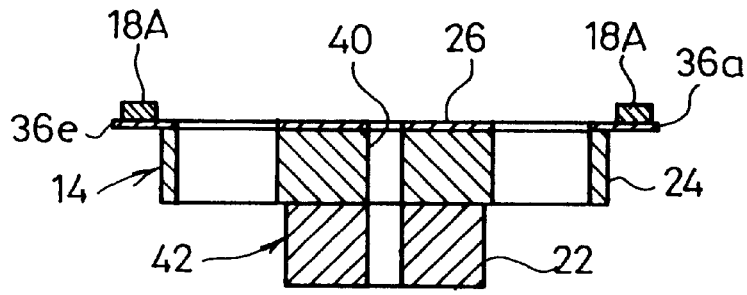
FIG. 12A shows a cross-sectional view taken along a line A—A in FIG. 11.
Figure 12B:
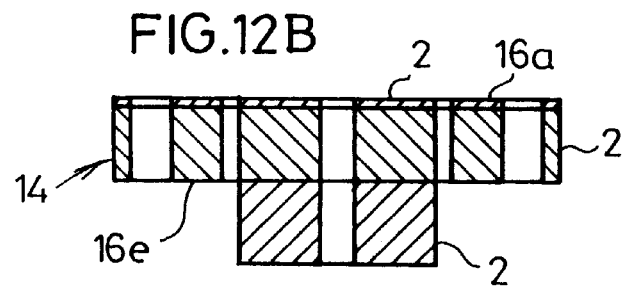
FIG. 12B shows a cross-sectional view taken along a line B—B in FIG. 11.

As shown in FIG. 12, the vibration gyro sensor according to the modified embodiment may be also grasped as an integrated stacked product comprising a spacer layer 22 as a lowermost layer, a substrate layer 24 as an intermediate layer, and a thin plate layer 26 as an uppermost layer, in the same manner as the vibration gyro sensor according to the third embodiment. The respective thin-walled regions 36*a* to 36*h* of the projections 44*a* to 44*h* are given by the thin plate layer 26, the annular section 14, the projections 44*a* to 44*h* (except for the thin-walled regions 36*a* to 36*h*), and the resilient sections 16*a* to 16*h*are given by integrating and stacking the thin plate layer 26 and the substrate layer 24, and the support section 42 is given by integrating and stacking the thin plate layer 26, the substrate layer 24, and the spacer layer 22.

The vibration gyro sensor according to the modified embodiment has the same advantages as those provided by the vibration gyro sensor according to the third embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor.

Especially, the minute vibration, which is generated on the thin-walled regions 36*a*, 36*c*, 36*e*, 36*g* of the annular section 14, can be transmitted to the entire annular section 14 with high following performance. Thus it is possible to greatly improve the amplitude of vibration of the annular section 14 caused by operating the driving piezoelectric/ electrostrictive elements 18A.

Next, a vibration gyro sensor according to a fourth embodiment will be explained with reference to FIGS. 13 and 14. Components or parts corresponding to those shown in FIGS. 5 and 6 are designated by the same reference numerals, duplicate explanation of which will be omitted.

Figure 13:
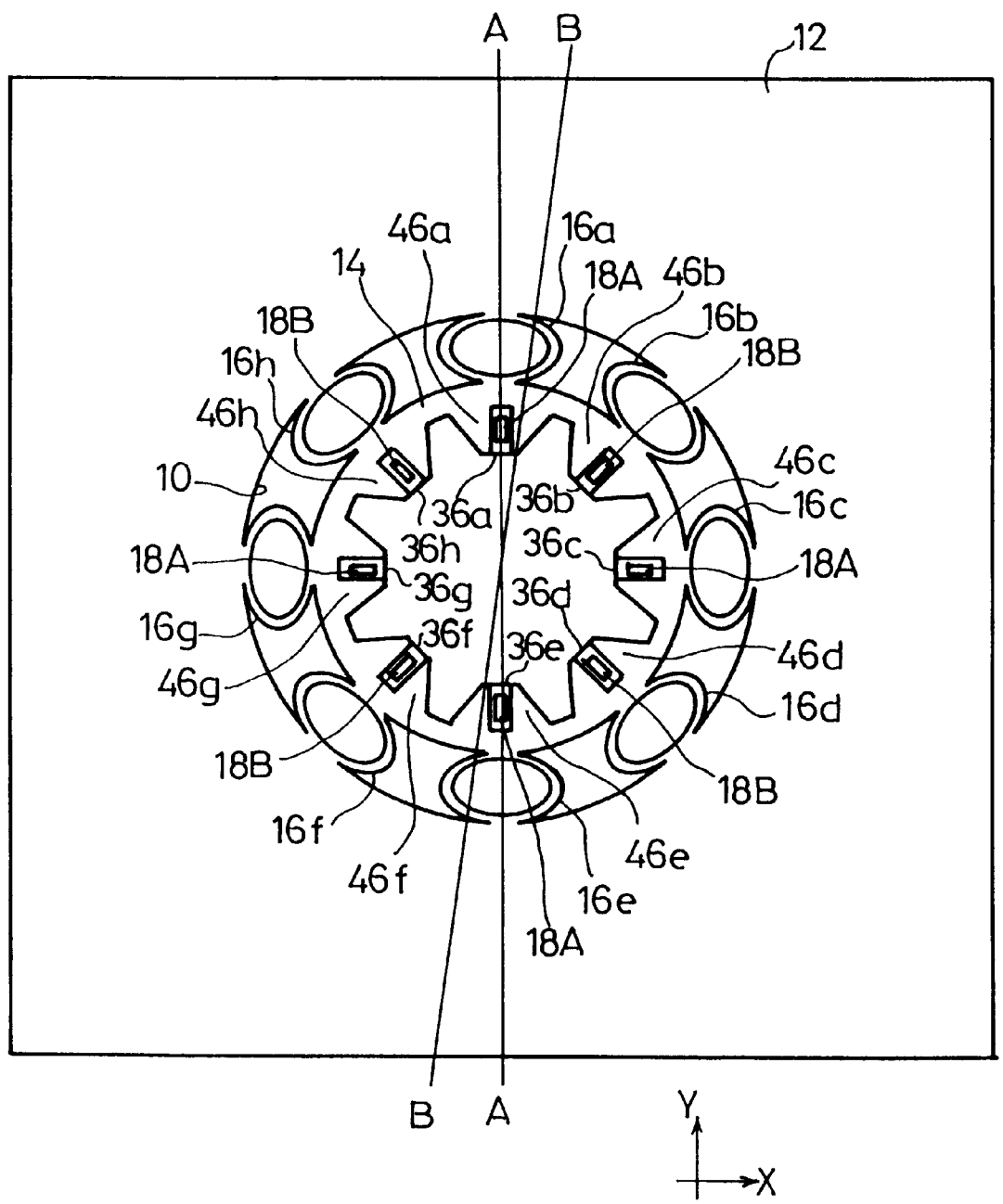
FIG. 13 shows a plan view illustrating a structure of a vibration gyro sensor according to a fourth embodiment.

As shown in FIG. 13, the vibration gyro sensor according to the fourth embodiment has approximately the same structure as that of the vibration gyro sensor according to the second embodiment. However, the former is different from the latter in that eight projections 46*a* to 46*h*, which protrude toward the center of the annular section 14, are formed on the inner circumference of the annular section 14 in an integrated manner, and in that piezoelectric/electrostrictive elements 18 are formed on the respective projections 46*a* to 46*h*.

Each of the projections 46*a* to 46*h* has an approximately trapezoidal planar configuration, with a thickness in its direction of height which is approximately the same as the thickness of the annular section 14. However, the thickness in the direction of height at the portion for forming the piezoelectric/electrostrictive element 18 is designed to be smaller than the thickness of the annular section 14. Namely, the portion of each of the projections 46*a* to 46*h*, on which the piezoelectric/electrostrictive element 18 is formed, is thin-walled (thin-walled regions 36*a* to 36*h*) so that the rigidity in the direction of vibration of the piezoelectric/ electrostrictive element 18 is lowered, and the amplitude of vibration is large at the annular section 14 (vibrator).

The projections 46*a* to 46*h* are provided as eight individuals corresponding to the resilient sections 16*a* to 16*h*, and they are disposed at positions at which they are separated from each other by equal spacing distances (distance to give a central angle of 45°) and they are mutually point-symmetrical. In the illustrative embodiment shown in FIG. 13, the driving piezoelectric/electrostrictive elements 18A are formed on the respective thin-walled regions 36*a*, 36*c*, 36*e*, 36*g* of the four projections 46*a*, 46*c*, 46*e*, 46*g* arranged in directions along the X and Y axes respectively, and the detecting piezoelectric/electrostrictive elements 18B are formed on the respective thin-walled regions 36*b*, 36*d*, 36*f*, 36*h* of the other four projections 46*b*, 46*d*, 46*f*, 46*h*.

Figure 14A:
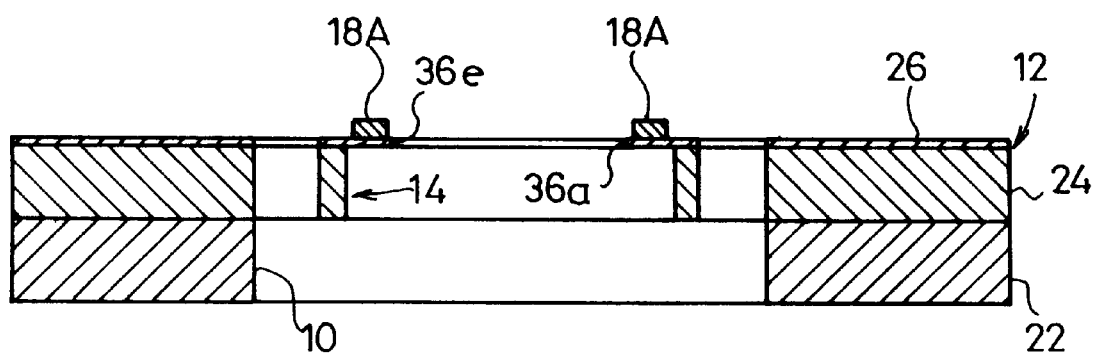
FIG. 14A shows a cross-sectional view taken along a line A—A in FIG. 13.
Figure 14B:
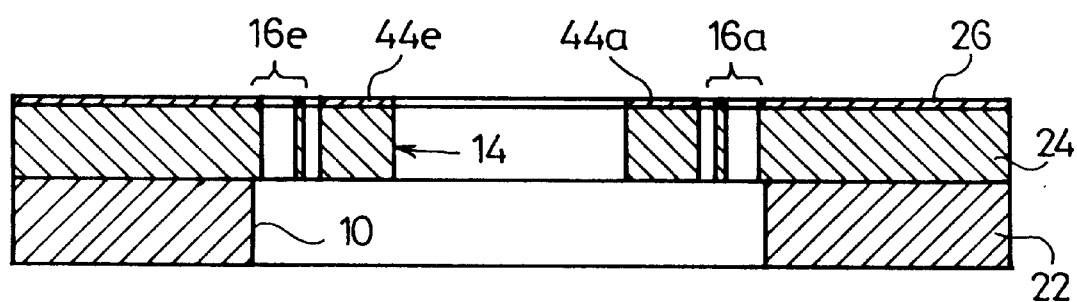
FIG. 14B shows a cross-sectional view taken along a line B—B in FIG. 13.

As shown in FIG. 14, the vibration gyro sensor may be grasped as an integrated stacked product comprising a spacer layer 22 as a lowermost layer, a substrate layer 24 as an intermediate layer, and a thin plate layer 26 as an uppermost layer. The thin-walled regions 36*a* to 36*h* of the projections 46*a* to 46*h* are given by the thin plate layer 26, the annular section 14, the projections 46*a* to 46*h* (except for the thin-walled regions 36*a* to 36*h*), and the resilient sections 16*a* to 16*h* are given by integrating and stacking the thin plate layer 26 and the substrate layer 24, and the annular frame 12 is given by integrating and stacking the thin plate layer 26, the substrate layer 24, and the spacer layer 22.

Each of the piezoelectric/electrostrictive elements 18 is directly formed on the thin-walled region 36 (thin plate layer 26) of the projection 46 in a state in which a thin film lower electrode 18*a*, a piezoelectric/electrostrictive film 18*b*, and an upper electrode 18*c* are stacked and integrated, in the same manner as the vibration gyro sensor according to the first embodiment.

The vibration gyro sensor according to the fourth embodiment has the same advantages as those provided by the vibration gyro sensor according to the second embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor.

Especially, each of the resilient sections 16*a* to 16*h* is constructed as the ring section having the approximately elliptic planar contour. Accordingly, the minute vibration, which is generated on the thin-walled regions 36*a*, 36*c*, 36*e*, 36*g* of the annular section 14, can be transmitted to the entire annular section 14 with high following performance. Thus it is possible to greatly improve the amplitude of vibration of the annular section 14 caused by operating the driving piezoelectric/electrostrictive elements 18A.

Next, a modified embodiment of the vibration gyro sensor according to the fourth embodiment will be explained with reference to FIGS. 15 and 16. Components or parts corresponding to those shown in FIGS. 13 and 14 are designated by the same reference numerals, duplicate explanation of which will be omitted.

Figure 15:
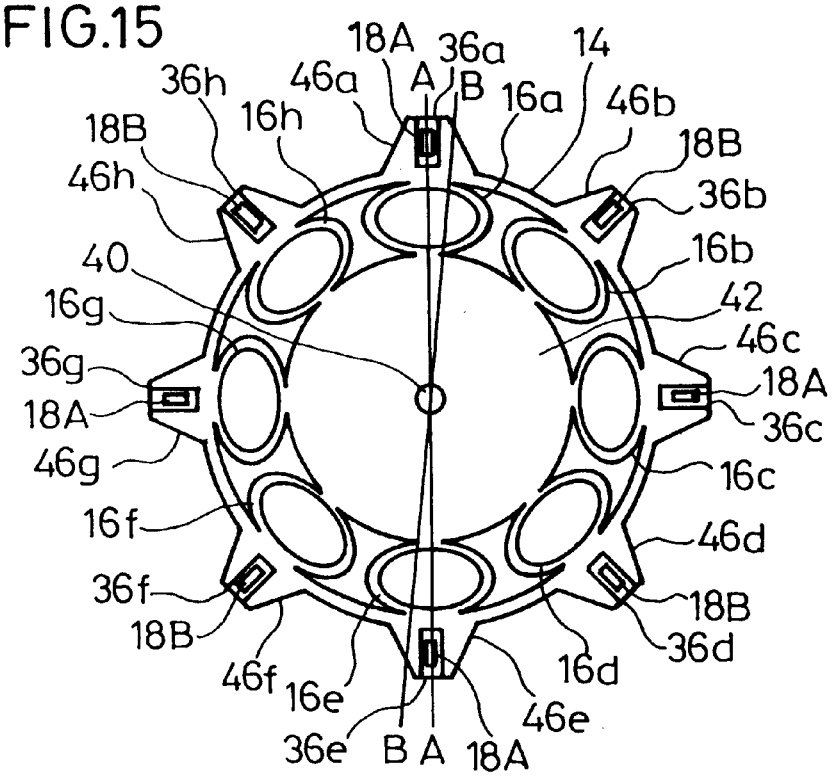
FIG. 15 shows a structure of a modified embodiment of the vibration gyro sensor according to the fourth embodiment.

As shown in FIG. 15, a vibration gyro sensor according to this modified embodiment has approximately the same structure as that of the vibration gyro sensor according to the fourth embodiment. However, the former is different from the latter in that in place of the annular frame 12, a support section 42 is constructed by an integrated fired product of ceramics together with the resilient sections 16a to 16h and the annular section 14, the support section 42 having an outer diameter smaller than an inner diameter of the annular section 14, and having a central hole 40, in that the eight resilient sections 16a to 16h are equivalently arranged between the inner circumference of the annular section 14 and the outer circumference of the support section 42, and in that eight projections 46a to 46h are formed so that they protrude outwardly from the outer circumference of the annular section 14.

Figure 16A:
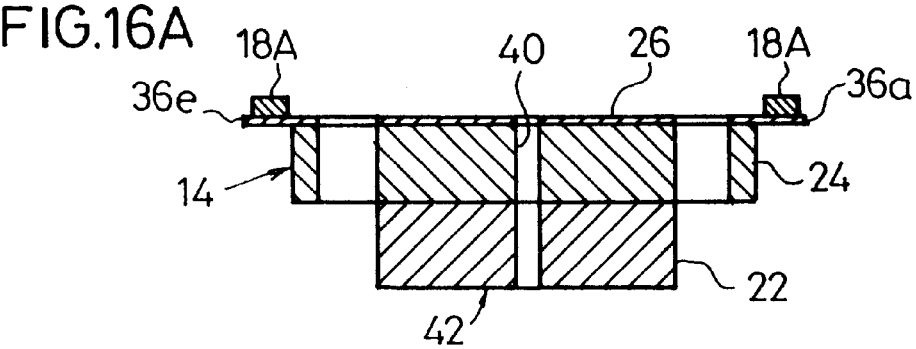
FIG. 16A shows a cross-sectional view taken along a line A—A in FIG. 15.
Figure 16B:
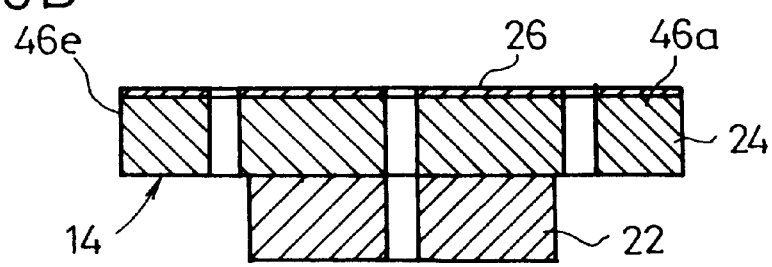
FIG. 16B shows a cross-sectional view taken along a line B—B in FIG. 15.

As shown in FIG. 16, the vibration gyro sensor according to the modified embodiment may be also grasped as an integrated stacked product comprising a spacer layer 22 as a lowermost layer, a substrate layer 24 as an intermediate layer, and a thin plate layer 26 as an uppermost layer, in the same manner as the vibration gyro sensor according to the fourth embodiment. The thin-walled regions 36a to 36h of the projections 46a to 46h are given by the thin plate layer 26, the annular section 14, the projections 46a to 46h (except for the thin-walled regions 36a to 36h), and the resilient sections 16a to 16h are given by integrating and stacking the thin plate layer 26 and the substrate layer 24, and the support section 42 is given by integrating and stacking the thin plate layer 26, the substrate layer 24, and the spacer layer 22.

Each of the piezoelectric/electrostrictive elements 18 is directly formed on the thin-walled region 36 (thin plate layer 26) of the projection 46 in a state in which a thin film lower electrode 18a, a piezoelectric/electrostrictive film 18b, and an upper electrode 18c are stacked and integrated, in the same manner as the vibration gyro sensor according to the first embodiment.

The vibration gyro sensor according to the modified embodiment has the same advantages as those provided by the vibration gyro sensor according to the fourth embodiment. Namely, the characteristics of the sensor are not affected by any ambient magnetic field, th e detection sensitivity on the detecting piezoelectric/electrostrictive elements 18B is greatly improved, and it is possible to facilitate realization of a compact size and a light weight of the sensor.

Especially, the minute vibration, which is generated on the thin-walled regions 36a, 36c, 36e, 36g of the annular section 14, can be transmitted to the entire annular section 14 with high following performance. Thus it is possible to greatly improve the amplitude of vibration of the annular section 14 caused by operating the driving piezoelectric/electrostrictive elements 18A.

Next, a vibration gyro sensor according to a fifth embodiment will be explained with reference to FIGS. 17 and 18. Components or parts corresponding to those shown in FIGS. 5 and 6 are designated by the same reference numerals, duplicate explanation of which will be omitted.

Figure 17:
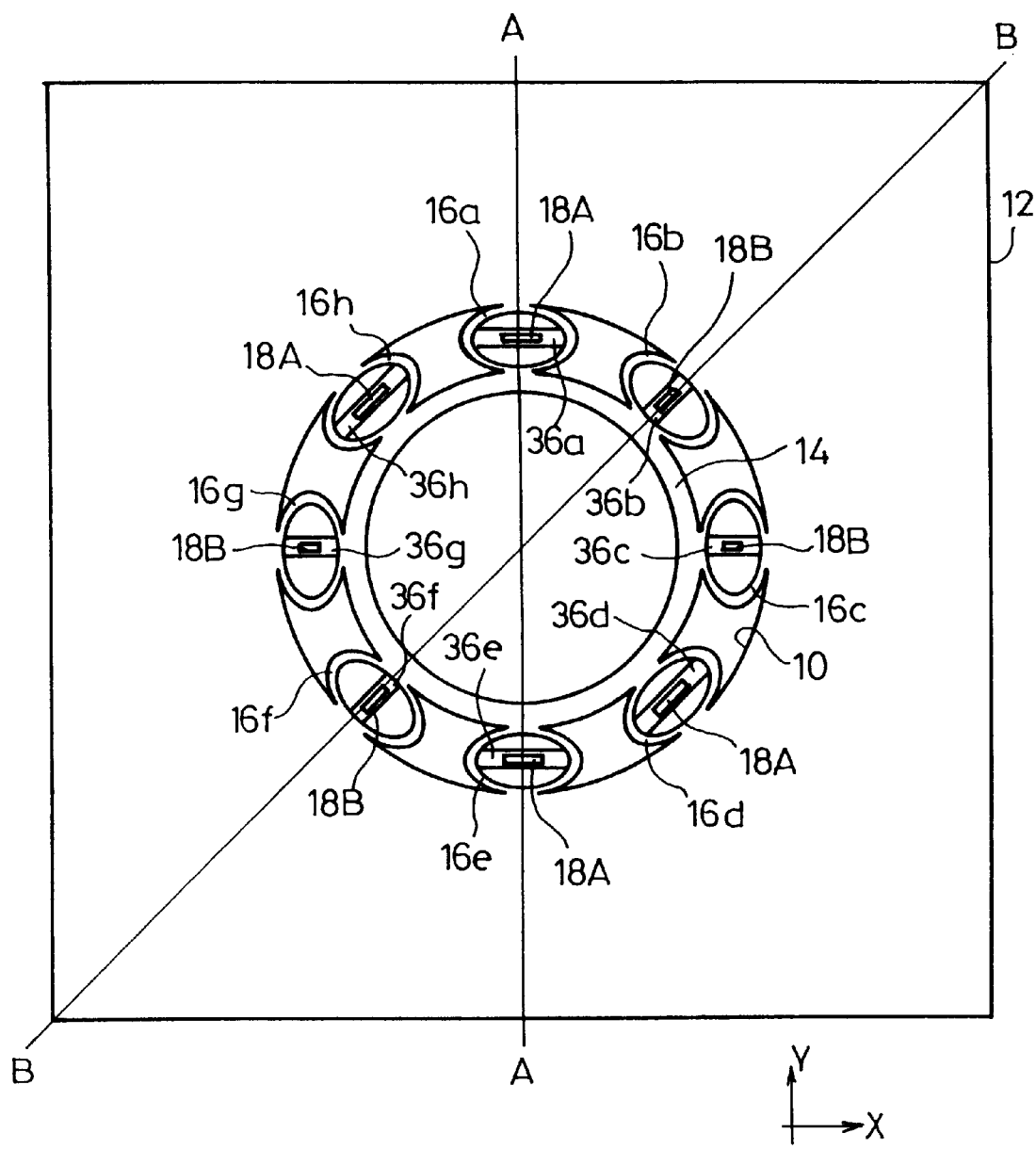
FIG. 17 shows a plan view illustrating a structure of a vibration gyro sensor according to a fifth embodiment.

As shown in FIG. 17, the vibration gyro sensor according to the fifth embodiment has approximately the same structure as that of the vibration gyro sensor according to the second embodiment. However, the former is different from the latter in that the annular section 14 does not include the thin-walled regions 36a to 36h, and in that minor axes or major axes of the resilient sections 16a to 16h are spanned with thin-walled sections 36a to 36h. The resilient sections 16a to 16h and the thin-walled regions 36a to 36h are formed of ceramics in an integrated manner.

In the illustrative embodiment shown in FIG. 17, the respective major axes of the two resilient sections 16a, 16e located along the Y axis and of the two resilient sections 16h, 16d adjacent at the left side to the resilient sections 16a, 16e are spanned with the thin-walled regions 36a, 36e, 36h, 36d. The respective minor axes of the other four resilient sections 16b, 16c, 16f, 16g are spanned with the thin-walled regions 36b, 36c, 36f, 36g.

Driving piezoelectric/electrostrictive elements 18A are formed on the thin-walled regions 36a, 36e, 36h, 36d which span the major axes of the resilient sections 16a, 16e, 16h, 16d respectively. Detecting piezoelectric/electrostrictive elements 18B are formed on the thin-walled regions 36b, 36c, 36f, 36g which span the minor axes of the resilient sections 16b, 16c, 16f, 16g respectively.

Figure 18A:
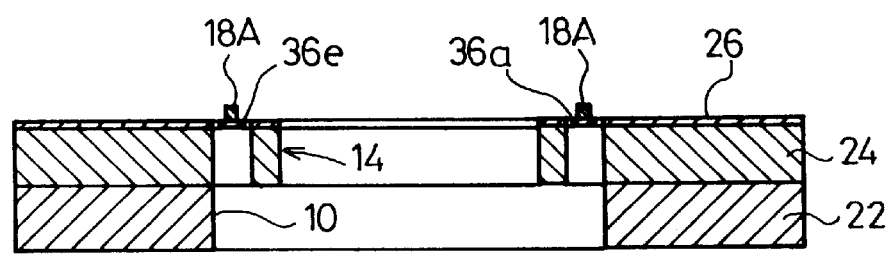
FIG. 18A shows a cross-sectional view taken along a line A—A in FIG. 17.
Figure 18B:
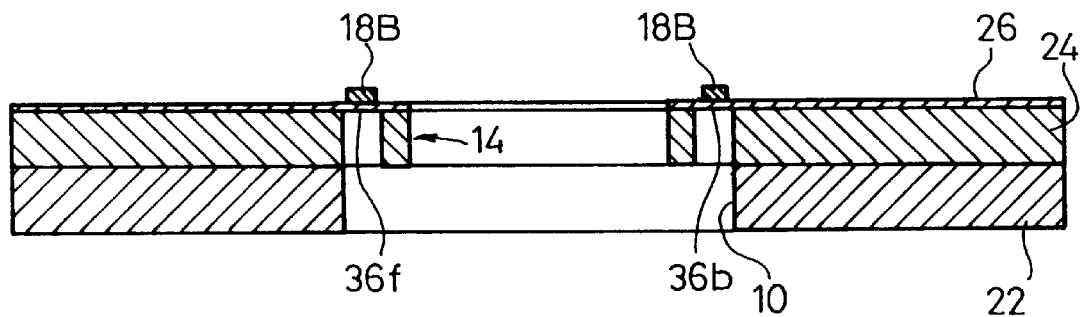
FIG. 18B shows a cross-sectional view taken along a line B—B in FIG. 17.

As shown in FIG. 18, the vibration gyro sensor according to the fifth embodiment may be also grasped as an integrated stacked product comprising a spacer layer 22 as a lowermost layer, a substrate layer 24 as an intermediate layer, and a thin plate layer 26 as an uppermost layer, in the same manner as the vibration gyro sensor according to the second embodiment. The thin-walled regions 36a to 36h which span the major axes or the minor axes of the resilient sections 16a to 16h are given by the thin plate layer 26, the annular section 14 and the resilient sections 16a to 16h (except for the thin-walled regions 36a to 36h) are given by integrating and stacking the thin plate layer 26 and the substrate layer 24, and the annular frame 12 is given by integrating and stacking the thin plate layer 26, the substrate layer 24, and the spacer layer 22.

Each of the piezoelectric/electrostrictive elements 18 is directly formed on the thin-walled region 36 (thin plate layer 26) of the resilient section 16 in a state in which a thin film lower electrode 18a, a piezoelectric/electrostrictive film 18b, and an upper electrode 18c are stacked and integrated, in the same manner as the vibration gyro sensor according to the first embodiment.

With reference to FIG. 17, the driving piezoelectric/electrostrictive elements 18A are formed on the two thin-walled regions 36a, 36e arranged along the Y axis and on the two thin-walled regions 36d, 36h arranged along an axis rotated counterclockwise by 45° from the Y axis respectively. The detecting piezoelectric/electrostrictive elements 18B are formed on the two thin-walled regions 36c, 36g arranged along the X axis and on the two thin-walled regions 36b, 36f arranged along an axis rotated counterclockwise by 45° from the X axis respectively.

Especially, the vibration gyro sensor according to the fifth embodiment is operated by using the driving piezoelectric/electrostrictive elements 18A formed on the thin-walled regions 36a, 36e. Characteristics (for example, frequency and amplitude) of the driving vibration are monitored (detected) by using the detecting piezoelectric/electrostrictive elements 18B formed on the thin-walled regions 36c, 36g. If any characteristic of the driving vibration is deviated from a prescribed characteristic (designed value), feedback control is applied to the driving piezoelectric/electrostrictive elements 18A formed on the thin-walled regions 36a, 36e so that the prescribed characteristic is obtained. When the detection is performed, a vibration based on the Coriolis force is detected by using the detecting piezoelectric/electrostrictive elements 18B on the thin-walled regions 36b, 36f. Simultaneously, a driving signal is fed to the detecting piezoelectric/electrostrictive elements 18B formed on the thin-walled regions 36d, 36h so that the vibration based on the Coriolis force is offset. Thus it is intended to generate no vibration based on the Coriolis force.

The reason why the vibration based on the Coriolis force is suppressed is as follows. In the case of the so-called resonance type vibration gyro sensor in which the driving system has a resonance frequency which is identical with that of the detecting system, it takes a long time to stabilize the vibration based on the Coriolis force. When the angular velocity changes in accordance with passage of time, for example, in automobiles, it is impossible to accurately measure the angular velocity by using such a sensor. Namely, the problem of response performance as described above disappears by suppressing the vibration based on the Coriolis force, and thus it is possible to highly accurately detect the angular velocity.

The foregoing discussion may be summarized as follows. The driving piezoelectric/electrostrictive elements 18A formed on the thin-walled regions 36a, 36e are active elements to serve for vibration, which have the function as piezoelectric/electrostrictive elements for generating the driving vibration. The detecting piezoelectric/electrostrictive elements 18B formed on the thin-walled regions 36c, 36g are passive elements to serve for vibration, which have the function as piezoelectric/electrostrictive elements for monitoring the driving vibration. The detecting piezoelectric/electrostrictive elements 18B formed on the thin-walled regions 36b, 36f are passive elements to serve for detection, which have the function as piezoelectric/electrostrictive elements for detecting the driving caused by the Coriolis force. The driving piezoelectric/electrostrictive elements 18A formed on the thin-walled regions 36d, 36h are active elements to serve for detection, which have the function as piezoelectric/electrostrictive elements for suppressing the driving caused by the Coriolis force.

The vibration gyro sensor according to the fifth embodiment has the same advantages as those provided by the vibration gyro sensor according to the second embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor.

Especially, in the vibration gyro sensor according to the fifth embodiment, the resilient sections 16a to 16h are constructed as the ring sections each having the approximately elliptic planar contour. The major axes of the four resilient sections 16a, 16e, 16h, 16d are spanned with the thin-walled regions 36a, 36e, 36h, 36d on which the driving piezoelectric/electrostrictive elements 18A are formed respectively. Accordingly, the minute amplitude of vibration in the direction of the major axis is converted into large amplitude of vibration in the direction of the minor axis. Thus it is possible to greatly improve the amplitude of vibration of the annular section 14 caused by operating the driving piezoelectric/electrostrictive elements 18A.

Next, a modified embodiment of the vibration gyro sensor according to the fifth embodiment will be explained with reference to FIGS. 19 and 20. Components or parts corresponding to those shown in FIGS. 17 and 18 are designated by the same reference numerals, duplicate explanation of which will be omitted.

Figure 19:
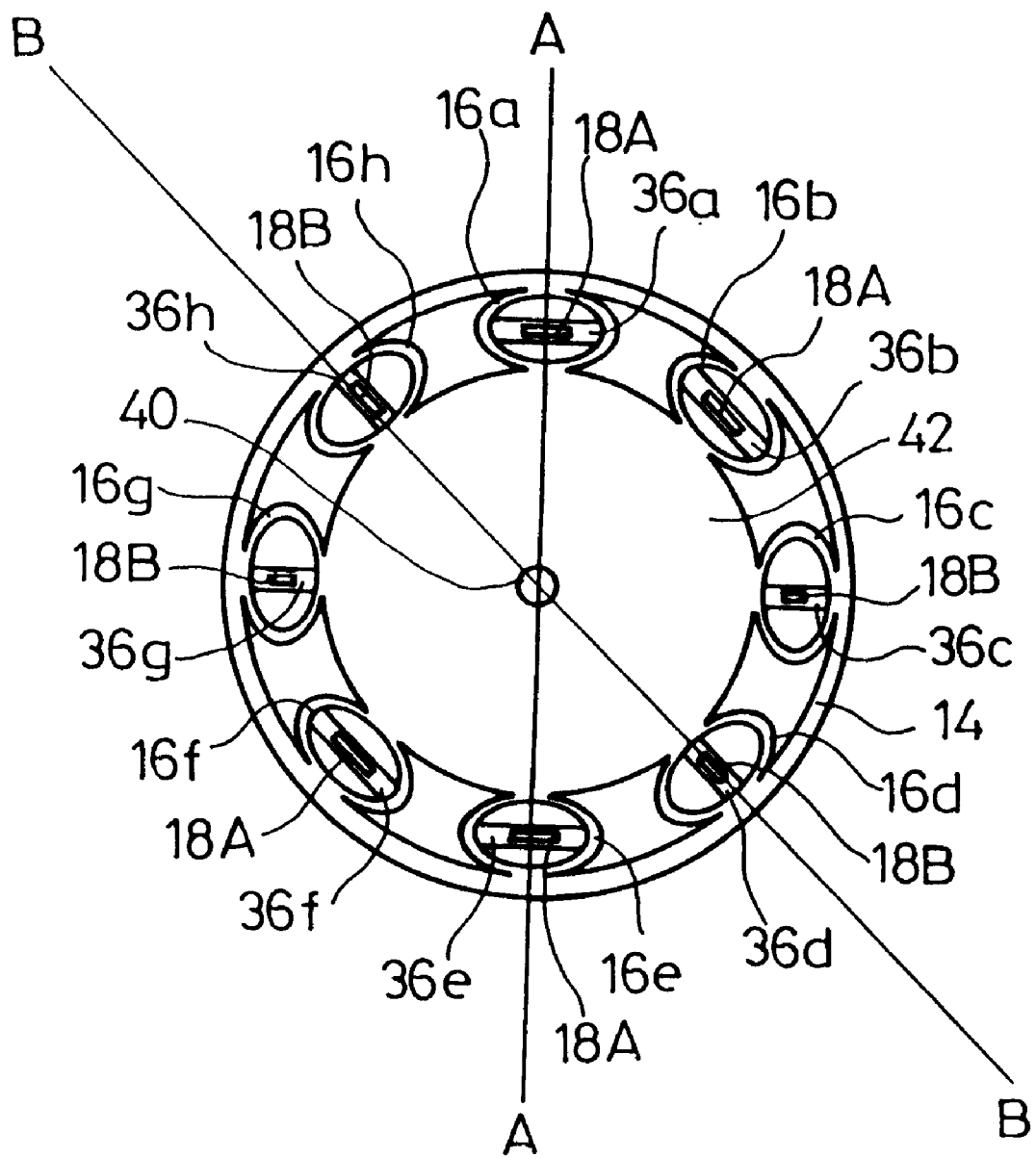
FIG. 19 shows a structure of a modified embodiment of the vibration gyro sensor according to the fifth embodiment.

As shown in FIG. 19, a vibration gyro sensor according to this modified embodiment has approximately the same structure as that of the vibration gyro sensor according to the fifth embodiment. However, the former is different from the latter in that in place of the annular frame 12, a support section 42 is constructed by an integrated fired product of ceramics together with the resilient sections 16a to 16h and the annular section 14, the support section 42 having an outer diameter smaller than an inner diameter of the annular section 14, and having a central hole 40, and in that the eight resilient sections 16a to 16h are equivalently arranged between the inner circumference of the annular section 14 and the outer circumference of the support section 42.

Especially, in the illustrative embodiment shown in FIG. 19, respective major axes of the two resilient sections 16a, 16e located along the Y axis and of the two resilient sections 16b, 16f adjacent at the right side to the resilient sections 16a, 16e are spanned with thin-walled regions 36a, 36e, 36b, 36f. Respective minor axes of the other four resilient sections 16c, 16d, 16g, 16h are spanned with thin-walled regions 36c, 36d, 36g, 36h.

Driving piezoelectric/electrostrictive elements 18A are formed on the thin-walled regions 36a, 36e, 36b, 36f which span the major axes of the resilient sections 16a, 16e, 16b, 16f respectively. Detecting piezoelectric/electrostrictive elements 18B are formed on the thin-walled regions 36c, 36d, 36g, 36h which span the minor axes of the resilient sections 16c, 16d, 16g, 16h respectively.

As shown in FIG. 20, the vibration gyro sensor according to the modified embodiment may be also grasped as an integrated stacked product comprising a spacer layer 22 as a lowermost layer, a substrate layer 24 as an intermediate layer, and a thin plate layer 26 as an uppermost layer, in the same manner as the vibration gyro sensor according to the fifth embodiment. The thin-walled regions 36a to 36h which span the major axes or the minor axes of the resilient sections 16a to 16h are given by the thin plate layer 26, the annular section 14 and the resilient sections 16a to 16h (except for the thin-walled regions 36a to 36h) are given by integrating and stacking the thin plate layer 26 and the substrate layer 24, and the support section 42 is given by integrating and stacking the thin plate layer 26, the substrate layer 24, and the spacer layer 22.

With reference to FIG. 19, the driving piezoelectric/electrostrictive elements 18A are formed on the two thin-walled regions 36a, 36e arranged along the Y axis and on the two thin-walled regions 36b, 36f arranged along an axis rotated clockwise by 45° from the Y axis respectively. The detecting piezoelectric/electrostrictive elements 18B are formed on the two thin-walled regions 36c, 36g arranged along the X axis and on the two thin-walled regions 36d, 36h arranged along an axis rotated clockwise by 45° from the X axis respectively.

In this embodiment, the driving piezoelectric/electrostrictive elements 18A formed on the thin-walled regions 36a, 36e have the function as piezoelectric/electrostrictive elements for generating the driving vibration. The detecting piezoelectric/electrostrictive elements 18B formed on the thin-walled regions 36c, 36g have the function as piezoelectric/electrostrictive elements for monitoring the driving vibration. The detecting piezoelectric/electrostrictive elements 18B formed on the thin-walled regions 36d, 36h have the function as piezoelectric/electrostrictive elements for detecting the driving caused by the Coriolis force. The driving piezoelectric/electrostrictive elements 18A formed on the thin-walled regions 36b, 36f have the function as piezoelectric/electrostrictive elements for suppressing the driving caused by the Coriolis force.

The vibration gyro sensor according to the modified embodiment has the same advantages as those provided by the vibration gyro sensor according to the fifth embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor. Further, it is possible to greatly improve the amplitude of vibration of the annular section 14 caused by operating the driving piezoelectric/electrostrictive elements 18A.

Next, a vibration gyro sensor according to a sixth embodiment will be explained with reference to FIGS. 21 and 22.

Figure 21:
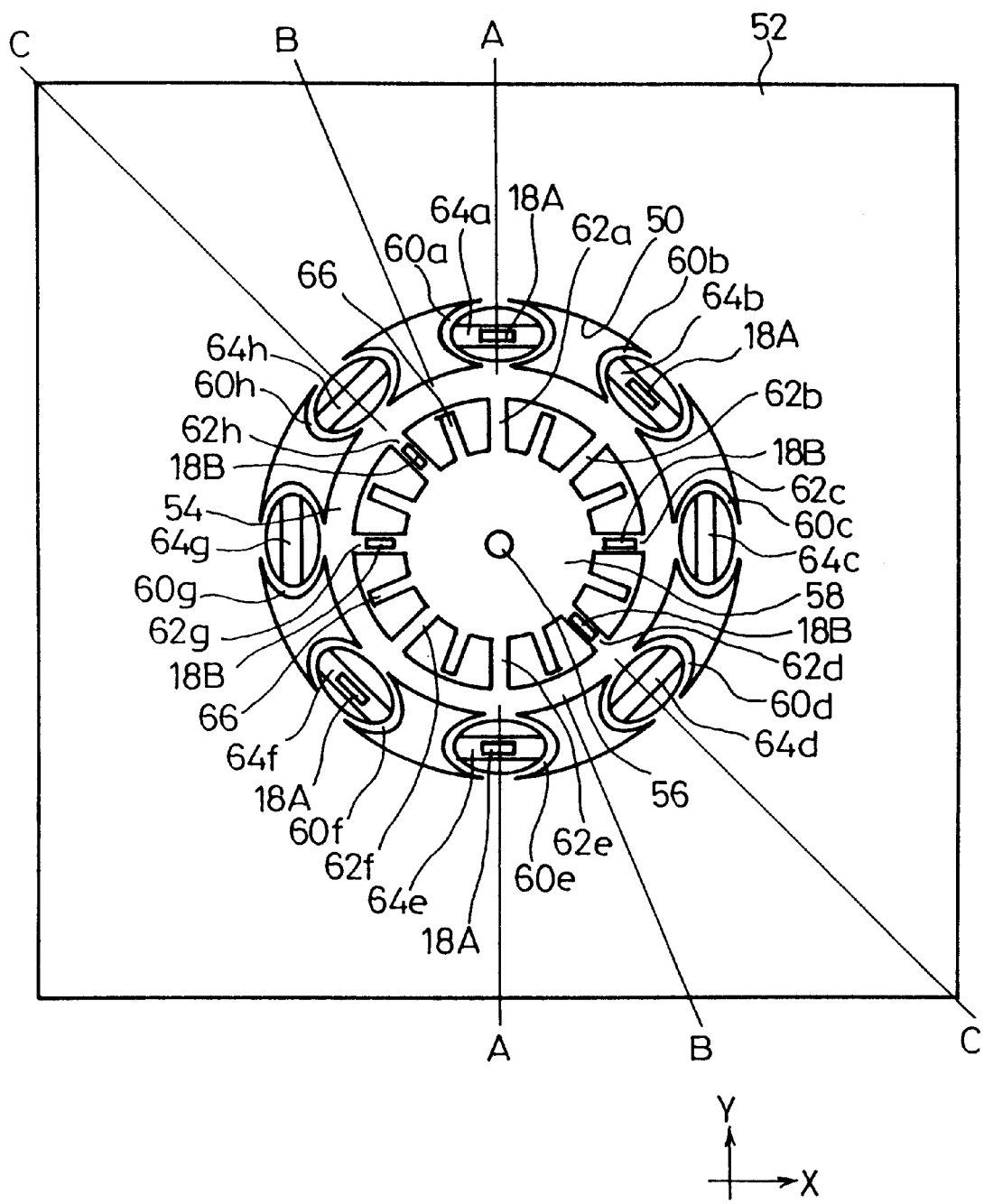
FIG. 21 shows a plan view illustrating a structure of a vibration gyro sensor according to a sixth embodiment.

As shown in FIG. 21, the vibration gyro sensor according to the sixth embodiment comprises an annular frame 52 having an approximately square planar contour with a central opening 50 of an approximately circular planar configuration, an annular section 54 arranged in the opening 50 of the annular frame 52 and having an approximately circular planar contour for constructing a vibrator, a support section 58 having an outer diameter smaller than an inner diameter of the annular section 54 and having a central hole 56, a plurality of outer resilient sections 60a to 60h which span the inner circumference of the annular frame 52 and the outer circumference of the annular section 54, and a plurality of inner resilient sections 62a to 62h which span the inner circumference of the annular section 54 and the outer circumference of the support section 58, wherein the annular frame 52, the annular section 54, the support section 58, and the plurality of outer resilient sections 60a to 60h, and the plurality of inner resilient sections 62a to 62h are constructed by an integrated fired product made of ceramics.

Each of the outer resilient sections 60a to 60h is composed of a ring section having an approximately elliptic planar configuration with its minor axis directed in a radial direction on the basis of the center of the annular section 54. Each of the outer resilient sections 60a to 60h has a thickness in a direction of height, the thickness being designed to be approximately the same as a thickness of the annular section 54.

The respective outer resilient sections 60a to 60h are arranged at positions at which they are separated from each other by equal spacing distances (distance to give a central angle of 45°) and they are mutually point-symmetrical, in the same manner as the vibration gyro sensor according to the fifth embodiment.

Major axes of the respective outer resilient sections 60a to 60h are spanned with thin-walled regions 64a to 64h each having a thickness smaller than that of the annular section 54 respectively. The outer resilient sections 60a to 60h and the thin-walled regions 64a to 64h are formed of ceramics in an integrated manner.

Each of the inner resilient sections 62a to 62h is formed to have a rectangular planar configuration, having a thickness in its direction of height designed to be smaller than the thickness of the annular section 54. Namely, each of the inner resilient sections 62a to 62h is thin-walled so that the rigidity in the direction of vibration of the piezoelectric/electrostrictive element 18 is lowered to give a large amplitude of vibration caused on the annular section 54. The respective inner resilient sections 62a to 62h are provided as eight individuals corresponding to the outer resilient sections 60a to 60h, and they are arranged at positions at which they are separated from each other by equal spacing distances (distance to give a central angle of 45°) and they are mutually point-symmetrical.

Driving piezoelectric/electrostrictive elements 18A are formed on the thin-walled regions 64 of the plurality of outer resilient sections 60 located at predetermined positions, of the eight outer resilient sections 60. Detecting piezoelectric/electrostrictive elements 18B are formed on the plurality of inner resilient sections 62 (thin-walled regions) located at predetermined positions, of the eight inner resilient sections 62.

In the illustrative embodiment shown in FIG. 21, the driving piezoelectric/electrostrictive elements 18A are formed on the respective thin-walled regions 64a, 64e, 64b, 64f of the two outer resilient sections 60a, 60e located along the direction of the Y axis and of the two outer resilient sections 60b, 60f adjacent at the right side to the outer resilient sections 60a, 60e respectively. The detecting piezoelectric/electrostrictive elements 18B are formed on the two inner resilient sections 62c, 62g located along the direction of the X axis and on the two inner resilient sections 62d, 62h adjacent at the right side to the inner resilient sections 62c, 62g respectively.

In this embodiment, the driving piezoelectric/electrostrictive elements 18A formed on the thin-walled regions 64a, 64e have the function as piezoelectric/electrostrictive elements for generating the driving vibration. The detecting piezoelectric/electrostrictive elements 18B formed on the inner resilient sections (thin-walled regions) 62c, 62g have the function as piezoelectric/electrostrictive elements for monitoring the driving vibration. The detecting piezoelectric/electrostrictive elements 18B formed on the inner resilient sections (thin-walled regions) 62d, 62h have the function as piezoelectric/electrostrictive elements for detecting the driving caused by the Coriolis force. The driving piezoelectric/electrostrictive elements 18A formed on the thin-walled regions 64b, 64f have the function as piezoelectric/electrostrictive elements for suppressing the driving caused by the Coriolis force.

Outwardly protruding projections 66 are provided in an integrated manner on the outer circumference of the support section 58 between the mutually adjacent inner resilient sections 62. The projections 66 are consequently formed when connecting sections are cut and removed at inner circumferential portions of the annular section 54, the connecting sections having been provided in order to connect the support section 58 and the annular section 54 at prescribed positions at the stage of production of the vibration gyro sensor, in the same manner as the vibration gyro sensor according to the first embodiment. Therefore, the projections 66 may be omitted or removed at the stage in which the vibration gyro sensor has been assembled.

As shown in FIG. 22, the vibration gyro sensor according to the sixth embodiment may be also grasped as an integrated stacked product comprising a spacer layer 22 as a lowermost layer, a substrate layer 24 as an intermediate layer, and a thin plate layer 26 as an uppermost layer. The thin-walled regions 64a to 64h which span the major axes of the outer resilient sections 60a to 60h and the inner resilient sections 62a to 62h (thin-walled regions) are given by the thin plate layer 26, the annular section 54, the outer resilient sections 60a to 60h (except for the thin-walled regions 64a to 64h), and the projections 66 are given by integrating and stacking the thin plate layer 26 and the substrate layer 24, and the annular frame 52 and the support section 58 are given by integrating and stacking the thin plate layer 26, the substrate layer 24, and the spacer layer 22.

The vibration gyro sensor according to the sixth embodiment has the same advantages as those provided by the vibration gyro sensor according to the second embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor.

Especially, in the vibration gyro sensor according to the sixth embodiment, the outer resilient sections 60a to 60h are constructed as the ring sections each having the approximately elliptic planar contour. The major axes of the four outer resilient sections 60a, 60e, 60b, 60f are spanned with the thin-walled regions 64a, 64e, 64b, 64f on which the driving piezoelectric/electrostrictive elements 18A are formed respectively. Accordingly, the minute amplitude of vibration in the direction of the major axis is converted into large amplitude of vibration in the direction of the minor axis, in the same manner as the vibration gyro sensor according to the fifth embodiment. Thus it is possible to greatly improve the amplitude of vibration of the annular section 54 caused by operating the driving piezoelectric/electrostrictive elements 18A.

Next, a modified embodiment of the vibration gyro sensor according to the sixth embodiment will be explained with reference to FIGS. 23 and 24. Components or parts corresponding to those shown in FIGS. 21 and 22 are designated by the same reference numerals, duplicate explanation of which will be omitted.

Figure 23:
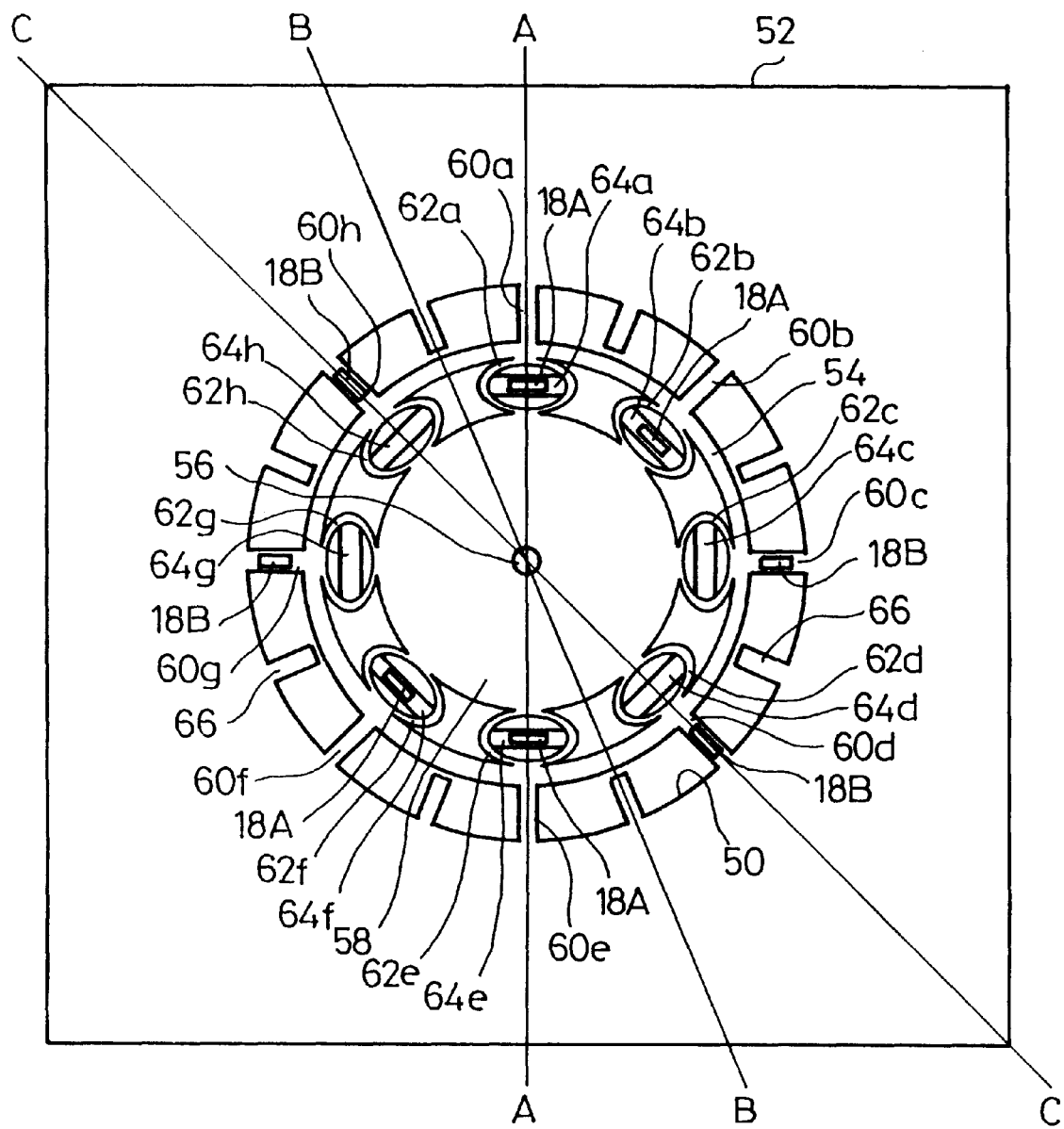
FIG. 23 shows a structure of a modified embodiment of the vibration gyro sensor according to the sixth embodiment.

As shown in FIG. 23, a vibration gyro sensor according to this modified embodiment has approximately the same structure as that of the vibration gyro sensor according to the sixth embodiment. However, the former is different in structure from the latter in the following points.

Namely, each of eight outer resilient sections 60a to 60h is formed to have a rectangular planar configuration to be thin-walled, having a thickness of its direction of height designed to be smaller than the thickness of the annular section 54. Each of inner resilient sections 62a to 62h is composed of a ring section having an approximately elliptic planar configuration with its minor axis directed in a radial direction on the basis of the center of the annular section 54, having a thickness in its direction of height designed to be approximately the same as the thickness of the annular section 54. Major axes of the respective inner resilient sections 62a to 62h are spanned with thin-walled regions 64a to 64h respectively. Detecting piezoelectric/electrostrictive elements 18B are formed on the four outer resilient sections 60c, 60d, 60g, 60h located at predetermined positions respectively. Driving piezoelectric/electrostrictive elements 18A are formed on the respective thin-walled regions 64a, 64b, 64e, 64f of the four inner resilient sections 62a, 62b, 62e, 62f located at predetermined positions respectively.

In this embodiment, the driving piezoelectric/electrostrictive elements 18A formed on the thin-walled regions 64a, 64e have the function as piezoelectric/electrostrictive elements for generating the driving vibration. The detecting piezoelectric/electrostrictive elements 18B formed on the outer resilient sections (thin-walled regions) 60c, 60g have the function as piezoelectric/electrostrictive elements for monitoring the driving vibration. The detecting piezoelectric/electrostrictive elements 18B formed on the thin-walled regions 64d, 64h have the function as piezoelectric/electrostrictive elements for detecting the driving caused by the Coriolis force. The driving piezoelectric/electrostrictive elements 18A formed on the outer resilient sections (thin-walled regions) 60b, 60f have the function as piezoelectric/electrostrictive elements for suppressing the driving caused by the Coriolis force.

Inwardly protruding projections 66 are provided in an integrated manner on the inner circumference of the annular frame 52 between the mutually adjacent outer resilient sections 60. The projections 66 are consequently formed when connecting sections are cut and removed at outer circumferential portions of the annular section 54, the connecting sections having been provided in order to support the annular section 54 at a prescribed position in the opening 50 of the annular frame 52 at the stage of production of the vibration gyro sensor, in the same manner as the vibration gyro sensor according to the sixth embodiment. Therefore, the projections 66 may be omitted or removed at the stage in which the vibration gyro sensor has been assembled.

As shown in FIG. 24, the vibration gyro sensor according to the modified embodiment may be also grasped as an integrated stacked product comprising a spacer layer 22 as a lowermost layer, a substrate layer 24 as an intermediate layer, and a thin plate layer 26 as an uppermost layer. The outer resilient sections 60a to 60h and the thin-walled regions 64a to 64h which span the major axes of the inner resilient sections 62a to 62h are given by the thin plate layer 26, the annular section 54, the inner resilient sections 62a to 62h (except for the thin-walled regions 64a to 64h), and the projections 66 are given by integrating and stacking the thin plate layer 26 and the substrate layer 24, and the annular frame 52 and the support. section 58 are given by integrating and stacking the thin plate layer 26, the substrate layer 24, and the spacer layer 22.

The vibration gyro sensor according to the modified embodiment has the same advantages as those provided by the vibration gyro sensor according to the sixth embodiment. Namely, the characteristics of the sensor are not affected by any ambient magnetic field, the detection sensitivity on the detecting piezoelectric/electrostrictive elements 18B is greatly improved, and it is possible to facilitate realization of a compact size and a light weight of the sensor. Further, it is possible to greatly improve the amplitude of vibration of the annular section 54 caused by operating the driving piezoelectric/electrostrictive elements 18A.

Any of the vibration gyro sensors according to the first to sixth embodiments is constructed by the integrated fired product made of ceramics, except for the driving piezoelectric/electrostrictive elements 18A, the detecting piezoelectric/electrostrictive elements 18B, and wiring. Specifically, the vibration gyro sensors are produced as follows.

At first, concerning the vibration gyro sensors according to the first to sixth embodiments (including the respective modified embodiments), their main sensor bodies are provided. Each of the main sensor bodies typically comprises the annular frame 12 (52), the annular section 14 (54), the support section 42 (58), and the resilient sections 16 (60, 62). Those usable, without any problem, as materials for forming the integrated fired product of ceramics for providing the main sensor body include any of ceramic materials composed of oxide and any of ceramic materials composed of those other than oxide, provided that the material is an insulative material or a dielectric material having large mechanical strength, which can be subjected to a heat treatment at about 1400° C. as described later on, and which can be stacked and integrated with the piezoelectric/electrostrictive element 18 and other components without using any adhesive or the like.

Especially, those preferably adopted include materials comprising a major component of at least any one of aluminum oxide, magnesium oxide, zirconium oxide, aluminum nitride, and silicon nitride, in order to obtain excellent operation characteristics, i.e., large displacement, large generated force, and quick response speed. In particular, it is recommended to use ceramic materials comprising, as a major component or major components, aluminum oxide and/or zirconium oxide.

More specifically, those advantageously used include materials comprising a major component of zirconium oxide stabilized with at lease one compound selected from the group consisting of yttrium oxide, ytterbium oxide, cerium oxide, calcium oxide, and magnesium oxide, because they exhibits features such as high toughness and high mechanical strength obtained even when the plate thickness is thin.

In order to stabilize zirconium oxide, the foregoing compound is preferably added in an amount of 1 mole % to 30 mole % in the case of yttrium oxide and ytterbium oxide, 6 mole % to 50 mole % in the case of cerium oxide, or 5 mole % to 40 mole % in the case of calcium oxide and magnesium oxide. Especially, it is desirable to use yttrium oxide as a stabilizer. In this case, yttrium oxide is desirably added in an amount of 1.5 mole % to 6 mole %, more preferably 2 mole % to 4 mole %.

When yttrium oxide is added to zirconium oxide in the foregoing range of addition, the crystal phase is partially stabilized, thus giving excellent characteristics for the main sensor body.

When stabilized or partially stabilized zirconia is used for the thin plate layer 26, it is preferable to contain an auxiliary shown in the following table. An equivalent effect can be obtained even when the piezoelectric/electrostrictive element 18 contains the following auxiliary.

TABLE 1

| Auxiliary | Preferable content range (% by weight) | More preferable range (% by weight) | Effect | Type of applicable electric field-induced strain |
|---|---|---|---|---|
| alumina | 0.1~5.0 | 0.2~2.0 | *1 | lateral effect |
| titania | 0.1~5.0 | 0.2~2.0 | *2 | longitudinal effect |

*1: Stress itself or dispersion of stress of the piezoelectric layer is reduced by avoiding conglutination (fusion) of the thin plate layer and the piezoelectric layer.
*2: Sufficient joining is ensured between the thin plate layer and the piezoelectric layer to obtain high reliability.

As shown in FIG. 2, for example, the integrated fired product of ceramics, which constructs the main sensor body as described above, comprises the thin plate layer 26, the substrate layer 24, and the spacer layer 22. However, it is preferable to contain silicon oxide (SiO, $SiO_2$) at least in the material to give the thin plate layer 26. The content of silicon oxide is preferably not less than 0.5% by weight and not more than 5% by weight, and especially desirably not less than 1% by weight and not more than 3% by weight.

When silicon oxide is contained in the foregoing ratio, it is possible to avoid any excessive reaction with the piezoelectric/electrostrictive element 18 during the heat treatment for the piezoelectric/electrostrictive element 18 formed on the thin plate layer 26. Accordingly, good actuator characteristics can be obtained in relation to the driving piezoelectric/electrostrictive element 18A, and good detection characteristics can be obtained in relation to the detecting piezoelectric/electrostrictive element 18B.

Further, in order to obtain quick response and large displacement in the vibration gyro sensors according to the first to sixth embodiments (including the respective modified embodiments), the thickness of the thin plate layer 26 on which the piezoelectric/electrostrictive elements 18 are formed in the integrated manner, i.e., the thickness of the thin-walled region 36 (64) is generally not more than 50 μm, preferably not more than 30 μm, and more preferably not more than 15 μm.

On the other hand, the thickness of the substrate layer 24 is appropriately determined. However, the thickness of the substrate layer 24 is generally not less than 30 μm, preferably not less than 50 μm, and more preferably not less than 100 μm.

In order to obtain large displacement and large generated force in the actuator or the detecting region, at least the thin plate layer 26 preferably has an average particle diameter of crystals of 0.1 to 2 μm. More preferably, the thin plate layer 26 is desirably composed of a ceramic material having an average particle diameter of not more than 1 μm.

Those usable to obtain the integrated fired product of ceramics to give the main sensor body comprising the thin plate layer 26, the substrate layer 24, and the spacer layer 22 as described above include, for example, a green sheet stacking method for stacking, in a state of green sheets, the thin plate layer 26, the substrate layer 24, and the spacer layer 22, as well as various molding methods based on the use of a mold, such as pressure molding, casting molding, and injection molding, and processing or machining methods for forming, for example, the annular frame 12 (52), the support section 42 (58), the annular section 14 (54), and the resilient sections 16 (60, 62) by means of machining processing such as ultrasonic, cutting, and grinding processing methods. Especially, it is preferable to use the green sheet stacking method as a method in which no processing stress remains, and the accuracy for the thickness of the thin plate layer 26 is high.

The green sheet stacking method is preferably based on the use of first, second, and third green sheets for providing the thin plate layer 26, the substrate layer 24, and the spacer layer 22 respectively. A method is adopted, in which the first, second, and third green sheets are stacked by means of thermal adhesion under a pressure, and then they are integrated with each other by firing. It is preferable to use, as the first to third green sheets, green sheets which at least have the same degree of percentage of contraction by firing, upon the firing and integration.

Figure 25:
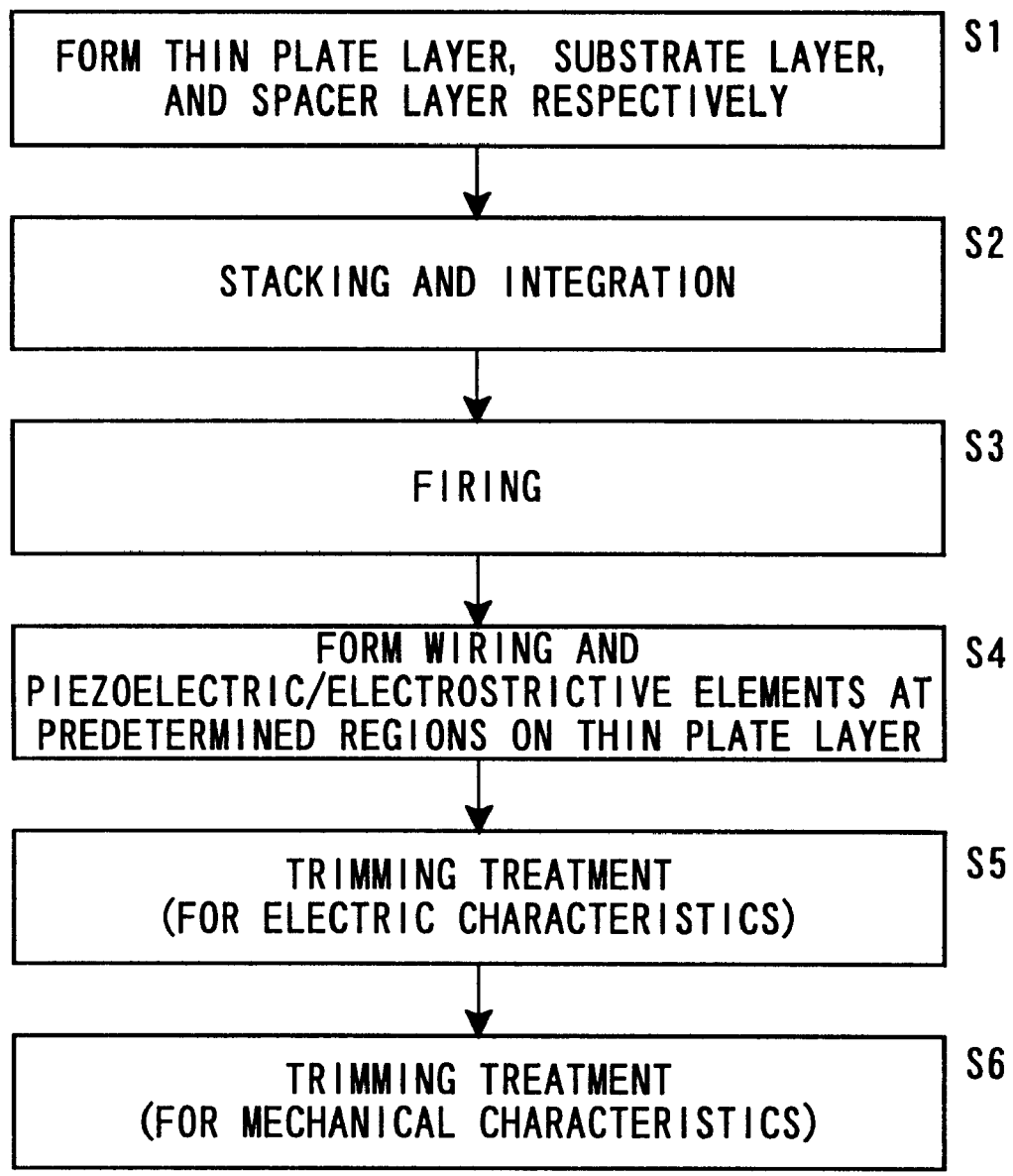
FIG. 25 shows a block diagram of production steps illustrating a first method of methods for producing the vibration gyro sensors according to the first to sixth embodiments (including the respective modified embodiments).
Figure 26:
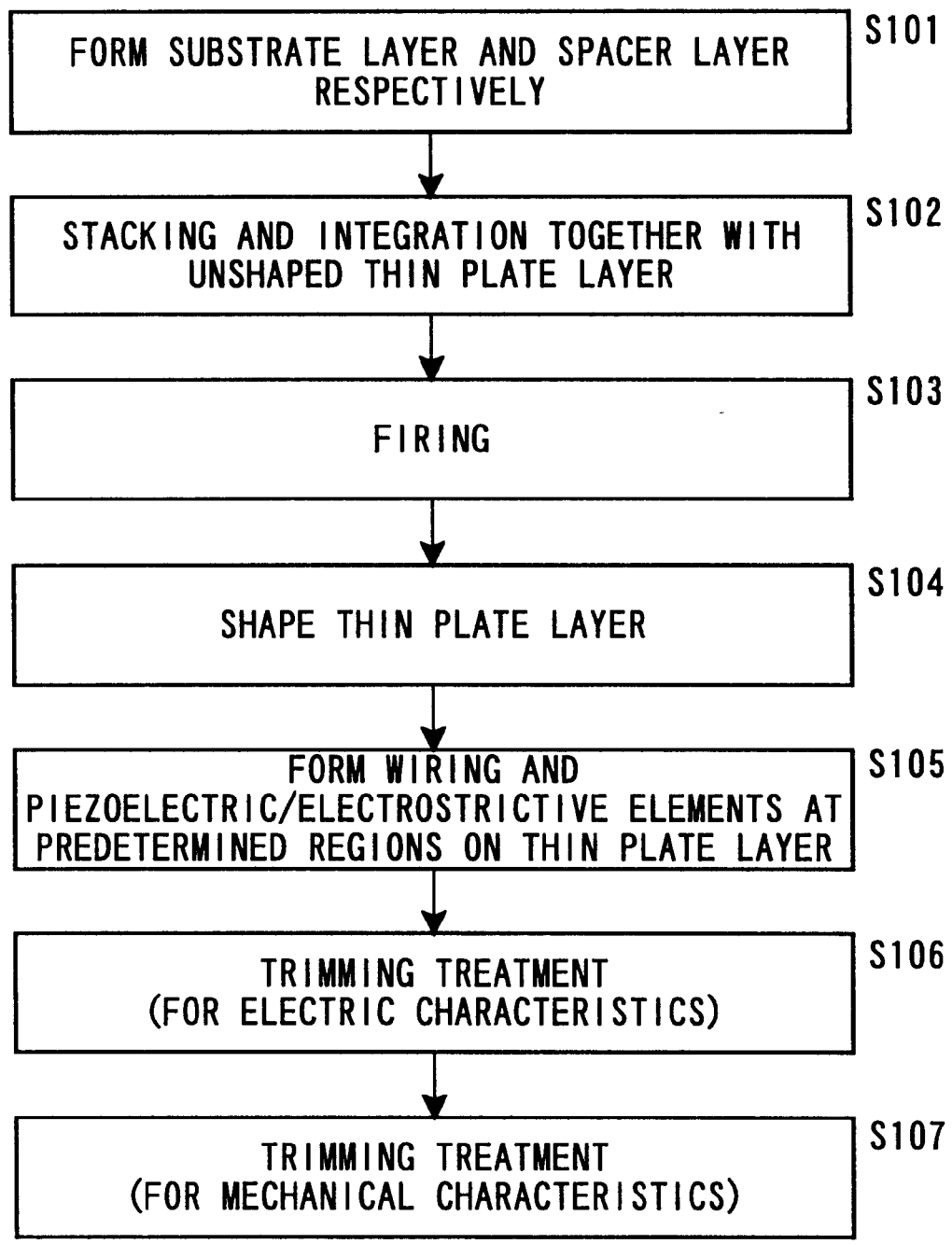
FIG. 26 shows a block diagram of production steps illustrating a second method of methods for producing the vibration gyro sensors according to the first to sixth embodiments (including the respective modified embodiments).
Figure 27:
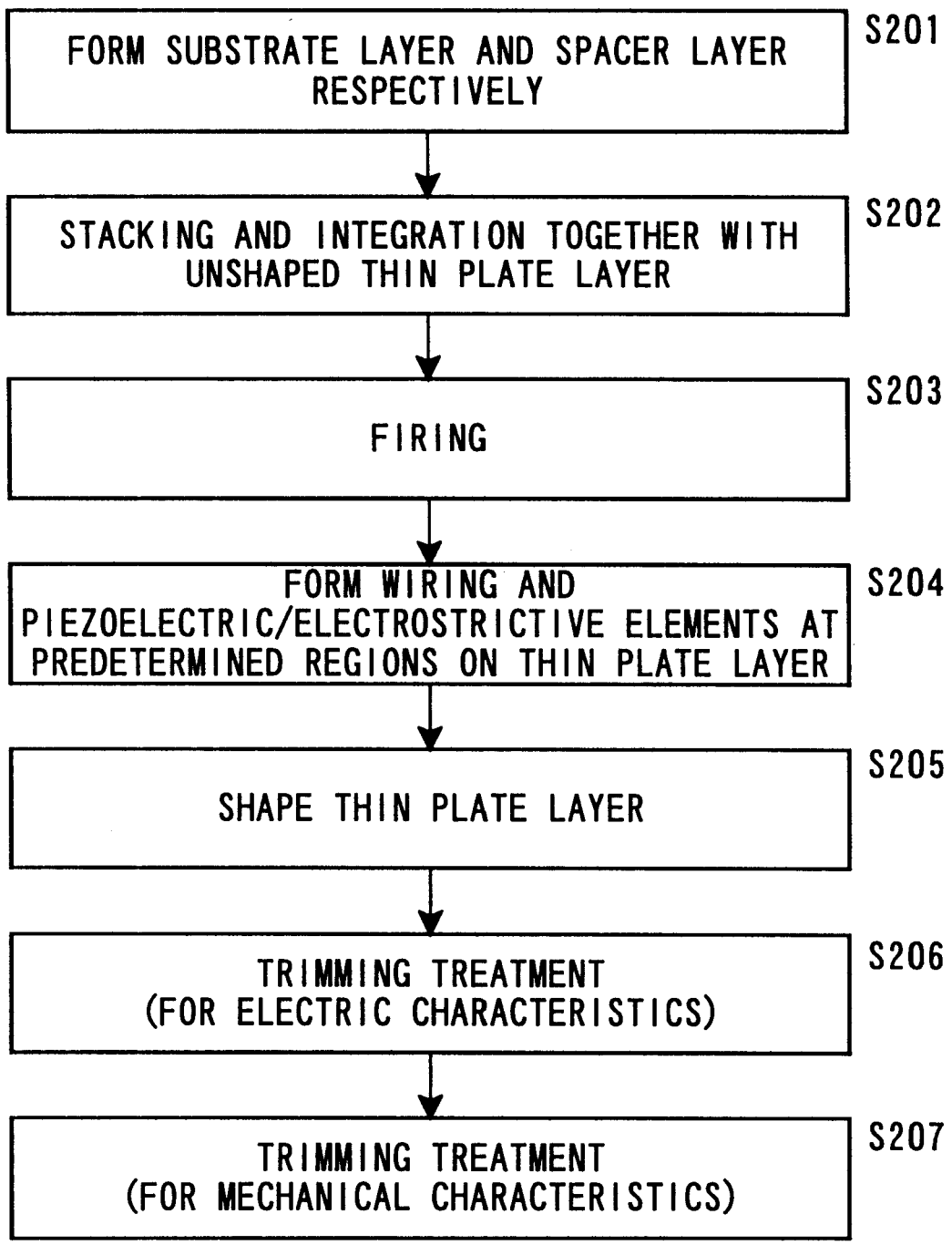
FIG. 27 shows a block diagram of production steps illustrating a third method of methods for producing the vibration gyro sensors according to the first to sixth embodiments (including the respective modified embodiments).

The green sheet stacking method, which is used to produce the vibration gyro sensors according to the first to sixth embodiments, specifically includes three methods. The respective methods are shown in FIGS. 25 to 27 respectively, as illustrated in block diagrams of production steps.

The first method will be described with reference to FIG. 25. First, second, and third green sheets are prepared, and they are formed to have shapes corresponding to the thin plate layer 26, the substrate layer 24, and the spacer layer 22 respectively (Step S1). This shaping step is performed by using the laser processing, the mold press working, or the ultrasonic processing.

Subsequently, the thin plate layer 26, the substrate layer 24, and the spacer layer 22 after the shaping step are stacked and integrated (Step S2), followed by firing to obtain an integrated fired product (Step S3).

Subsequently, the driving piezoelectric/electrostrictive elements 18A, the detecting piezoelectric/electrostrictive elements 18B, and wiring are formed at predetermined regions on the thin plate layer 26 (Step S4 ). This step for forming the driving piezoelectric/electrostrictive elements 18A, the detecting piezoelectric/electrostrictive elements 18B, and wiring is performed by using, for example, screen printing, dipping, ion beam, sputtering, vacuum vapor deposition, ion plating, CVD (chemical vapor deposition), and plating methods.

Subsequently, the respective upper electrodes 18c of the driving piezoelectric/electrostrictive elements 18A and the detecting piezoelectric/electrostrictive elements 18B are subjected to a trimming treatment to adjust electric characteristics of the respective piezoelectric/electrostrictive elements 18A, 18B (Step S5). The trimming treatment is performed, for example, by means of laser processing or plasma etching such as RIE.

Subsequently, the annular section 14 (54), the resilient sections 16 (60, 62), the projections 20 (66), and the thin-walled regions 36 (64) are subjected to a trimming treatment to adjust mechanical characteristics of the main sensor body (Step S6). The trimming treatment is performed, for example, by means of laser processing or ultrasonic processing.

According to the method described above, the vibration gyro sensors according to the first to sixth embodiments (including the respective modified embodiments) can be easily produced with high reliability.

The electric characteristics of the piezoelectric/electrostrictive elements 18 can be conveniently adjusted by performing the trimming treatment for the upper electrodes 18c of the piezoelectric/electrostrictive elements 18. Further, the mechanical characteristics of the vibrator or other components can be conveniently adjusted by performing the trimming treatment for the annular section 14 (54) and the resilient sections 16 (60, 62). Accordingly, this method is advantageous in that the number of production steps can be reduced.

Vibration gyro sensors, which have been hitherto used, employ the elinvar alloy for the vibrator in many cases, and the bulky piezoelectric/electrostrictive element formed with the electrode is fixed to the vibrator by means of adhesion. Therefore, it is necessary to use solder or Ag paste for connecting external wiring to the electrode of the piezoelectric/electrostrictive element. In this procedure, for example, the solder, the Ag paste, and the external wiring itself behave as added weights to greatly affect the vibration characteristics of the vibrator, making it difficult to produce the gyro sensors.

Vibration gyro sensors of another type is also known, in which a piezoelectric ceramic is used for the vibrator. However, such vibration gyro sensors are not essentially different from the foregoing conventional vibration gyro sensor in that the lead wire is connected to the part which is used to make vibration. Problems arise in that (a) the connecting section to the external wiring is less reliable, and (b) the dispersion in production is large.

However, the vibration gyro sensors according to the first to sixth embodiments (including the respective modified embodiments) described above are advantageous in that external wiring can be easily connected to the pair of electrodes of the respective piezoelectric/electrostrictive elements 18.

In the present invention, the annular frame 12 (52), the annular section 14 (54), the resilient sections 16 (60, 62), the support section 42 (58), and other components are constructed as a whole by the integrated fired product composed of ceramics (non-conductive substances) represented by zirconia oxide. Accordingly, the present invention is advantageous in that external wiring can be directly wired and formed on the foregoing components by means of the film formation method. In addition to this advantage, the film formation method such as screen printing is used for forming the electrodes of the driving piezoelectric/electrostrictive elements 18A and the detecting piezoelectric/electrostrictive elements 18B. Accordingly, the present invention is also advantageous in that when the electrodes of the piezoelectric/electrostrictive elements 18 are formed, the wiring for these electrodes can be simultaneously extended up to the annular frame 12 (52) or the support section 42 (58) so that the vibration characteristics are not affected. Therefore, it is possible to realize improvement in yield and easy production of the vibration gyro sensor.

Next, the second method will be described with reference to FIG. 26. First, second, and third green sheets are prepared, of which the second and third green sheets are formed to have shapes corresponding to the substrate layer 24 and the spacer layer 22 respectively (Step S101).

Subsequently, the substrate layer 24 and the spacer layer 22 after the shaping step are stacked and integrated together with the first green sheet (unshaped thin plate layer 26) (Step S102), followed by firing to obtain an integrated fired product (Step S103). After that, the thin plate layer 26 disposed as the uppermost layer is shaped to give a shape corresponding to the thin plate layer 26 (Step S104).

Subsequently, the driving piezoelectric/electrostrictive elements 18A, the detecting piezoelectric/electrostrictive elements 18B, and wiring are formed at predetermined regions on the thin plate layer 26 (Step S105). After that, the respective upper electrodes 18c of the driving piezoelectric/electrostrictive elements 18A and the detecting piezoelectric/electrostrictive elements 18B are subjected to a trimming treatment to adjust electric characteristics of the respective piezoelectric/electrostrictive elements 18 (Step S106). Further, the annular section 14 (54), the resilient sections 16 (60, 62), the projections 20 (66), and the thin-walled regions 36 (64) are subjected to a trimming treatment to adjust mechanical characteristics of the main sensor body (Step S107).

According to the second method, the vibration gyro sensors according to the first to sixth embodiments (including the respective modified embodiments) can be also easily produced with high reliability, in the same manner as the first method described above. Further, the electric characteristics of the piezoelectric/electrostrictive elements 18 can be conveniently adjusted, and the mechanical characteristics of the vibrators or other components can be conveniently adjusted. Accordingly, the second method is advantageous in that the number of production steps can be reduced.

Further, the annular frame 12 (52), the annular section 14 (54), the resilient sections 16 (60, 62), the support section 42 (58), and other components are constructed as a whole by the integrated fired product composed of ceramics (non-conductive substances) represented by zirconia oxide. Accordingly, the present invention is advantageous in that the external wiring can be directly wired and formed on the foregoing components by means of the film formation method. In addition to this advantage, the film formation method such as screen printing is used for forming the electrodes of the driving piezoelectric/electrostrictive elements 18A and the detecting piezoelectric/electrostrictive elements 18B. Accordingly, the present invention is also advantageous in that when the electrodes of the piezoelectric/electrostrictive elements 18 are formed, the wiring for these electrodes can be simultaneously extended up to the annular frame 12 (52) or the support section 42 (58) so that the vibration characteristics are not affected. Therefore, it is possible to realize improvement in yield and easy production of the vibration gyro sensor.

Next, the third method will be described with reference to FIG. 27. First, second, and third green sheets are prepared, of which the second and third green sheets are formed to have shapes corresponding to the substrate layer 24 and the spacer layer 22 respectively (Step S201).

Subsequently, the substrate layer 24 and the spacer layer 22 after the shaping step are stacked and integrated together with the first green sheet (unshaped thin plate layer 26) (Step S202), followed by firing to obtain an integrated fired product (Step S203).

After that, the driving piezoelectric/electrostrictive elements 18A, the detecting piezoelectric/electrostrictive elements 18B, and wiring are formed at predetermined regions on the first green sheet disposed as the uppermost layer (unshaped thin plate layer 26) (Step S204). Subsequently, the first green sheet is shaped to give a shape corresponding to the thin plate layer 26 (Step S205).

Subsequently, the respective upper electrodes 18c of the driving piezoelectric/electrostrictive elements 18A and the detecting piezoelectric/electrostrictive elements 18B are subjected to a trimming treatment to adjust electric characteristics of the respective piezoelectric/electrostrictive elements 18 (Step S206). Further, the annular section 14 (54), the resilient sections 16 (60, 62), the projections 20 (66), and the thin-walled regions 36 (64) are subjected to a trimming treatment to adjust mechanical characteristics of the main sensor body (Step S207).

According to the third method, the vibration gyro sensors according to the first to sixth embodiments (including the respective modified embodiments) can be also easily produced with high reliability, in the same manner as the first method described above. Further, the electric characteristics of the piezoelectric/electrostrictive elements 18 can be conveniently adjusted, and the mechanical characteristics of the vibrators or other components can be conveniently adjusted. Accordingly, the third method is advantageous in that the number of production steps can be reduced.

Further, the annular frame 12 (52), the annular section 14 (54), the resilient sections 16 (60, 62), the support section 42 (58), and other components are constructed as a whole by the integrated fired product composed of ceramics (non-conductive substances) represented by zirconia oxide. Accordingly, the present invention is advantageous in that the external wiring can be directly wired and formed on the foregoing components by means of the film formation method. In addition to this advantage, the film formation method such as screen printing is used for forming the electrodes of the driving piezoelectric/electrostrictive elements 18A and the detecting piezoelectric/electrostrictive elements 18B. Accordingly, the present invention is also advantageous in that when the electrodes of the piezoelectric/electrostrictive elements 18 are formed, the wiring for these electrodes can be simultaneously extended up to the annular frame 12 (52) or the support section 42 (58) so that the vibration characteristics are not affected. Therefore, it is possible to realize improvement in yield and easy production of the vibration gyro sensor.

In the first to third methods described above, the shapes of the thin plate layer 26, the substrate layer 24, and the spacer layer 22 are preferably realized and established by adopting, for example, the laser processing, the press working with a mold, and the ultrasonic processing applied to the first, second, and third green sheets. Especially, it is advantageous to use the press working with a mold, because this method is excellent in performance of mass production and performance concerning stacking and integration.

Figure 28:
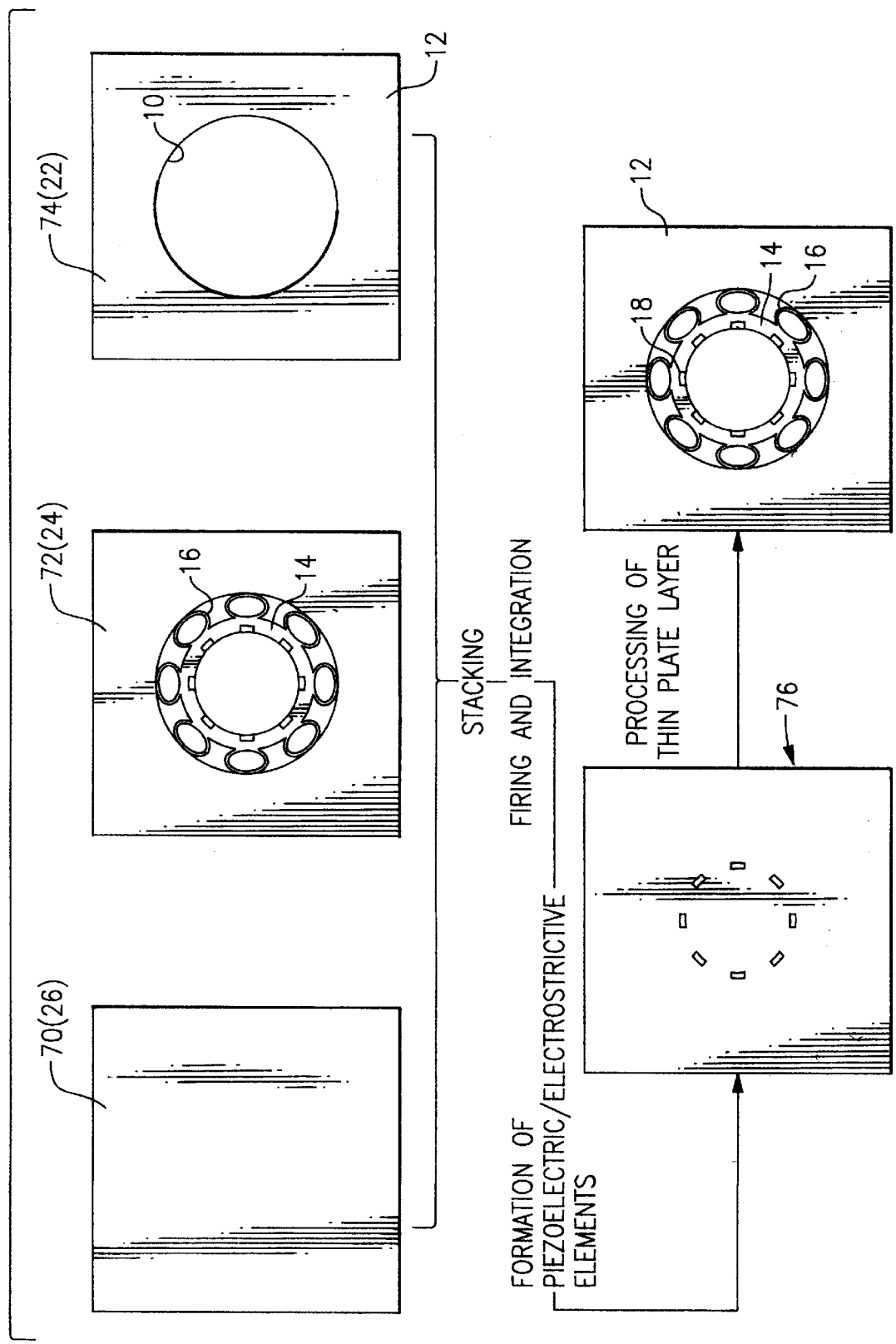
FIG. 28 illustratively shows exemplary production steps for the vibration gyro sensor according to the second embodiment.

FIG. 28 illustratively shows exemplary production steps for producing, for example, the vibration gyro sensor according to the second embodiment (see FIG. 5) in accordance with the third method.

In this procedure, a first green sheet 70 for giving the thin plate layer 26 is not processed into the shape of the thin plate layer 26 at all. The first green sheet 70 is merely used as one thin plate having a rectangular configuration. A second green sheet 72 for giving the substrate layer 24 is processed into the shape corresponding to the shape of the substrate layer 24. A third green sheet 74 for giving the spacer layer 22 is also processed into the shape corresponding to the shape of the spacer layer 22.

The first, second, and third green sheets 70, 72, 74 are stacked, and then they are fired and integrated into one unit. After that, the piezoelectric/electrostrictive elements 18 are formed in an integrated manner on the predetermined regions on the unshaped thin plate layer 26 of the obtained fired product 76 in accordance with the film formation method.

Subsequently, cutting processing is applied to predetermined portions of the unshaped thin plate layer 26 of the integrated fired product 76 by means of, for example, laser processing or ultrasonic processing. Thus the vibration gyro sensor according to the second embodiment shown in FIG. 5 is completed.

In the case of the second method described above (FIG. 26), the order of the step of forming the driving piezoelectric/electrostrictive elements 18A and the detecting piezoelectric/electrostrictive elements 18B and the step of processing the thin plate layer 26 is inverted, and the piezoelectric/electrostrictive elements 18A, 18B are formed in an integrated manner. Thus the vibration gyro sensor shown in FIG. 5 is completed.

As clarified from FIGS. 1 and 2, in the case of the structure of the vibration gyro sensor according to the first embodiment shown in FIG. 1, the resilient sections 16 which span the annular frame 12 and the annular section 14 are formed only by the thin plate layer 26 given by the first green sheet 70. Therefore, there is an implicit problem in that deformation tends to occur upon firing and upon heat treatment performed when the piezoelectric/electrostrictive elements 18 are formed, in addition to the fact that it is difficult to position the annular section 14 at the prescribed position in the opening 10 of the annular frame 12, when the second green sheet 72 and the third green sheet 74 are processed into the prescribed shapes.

Figure 29:
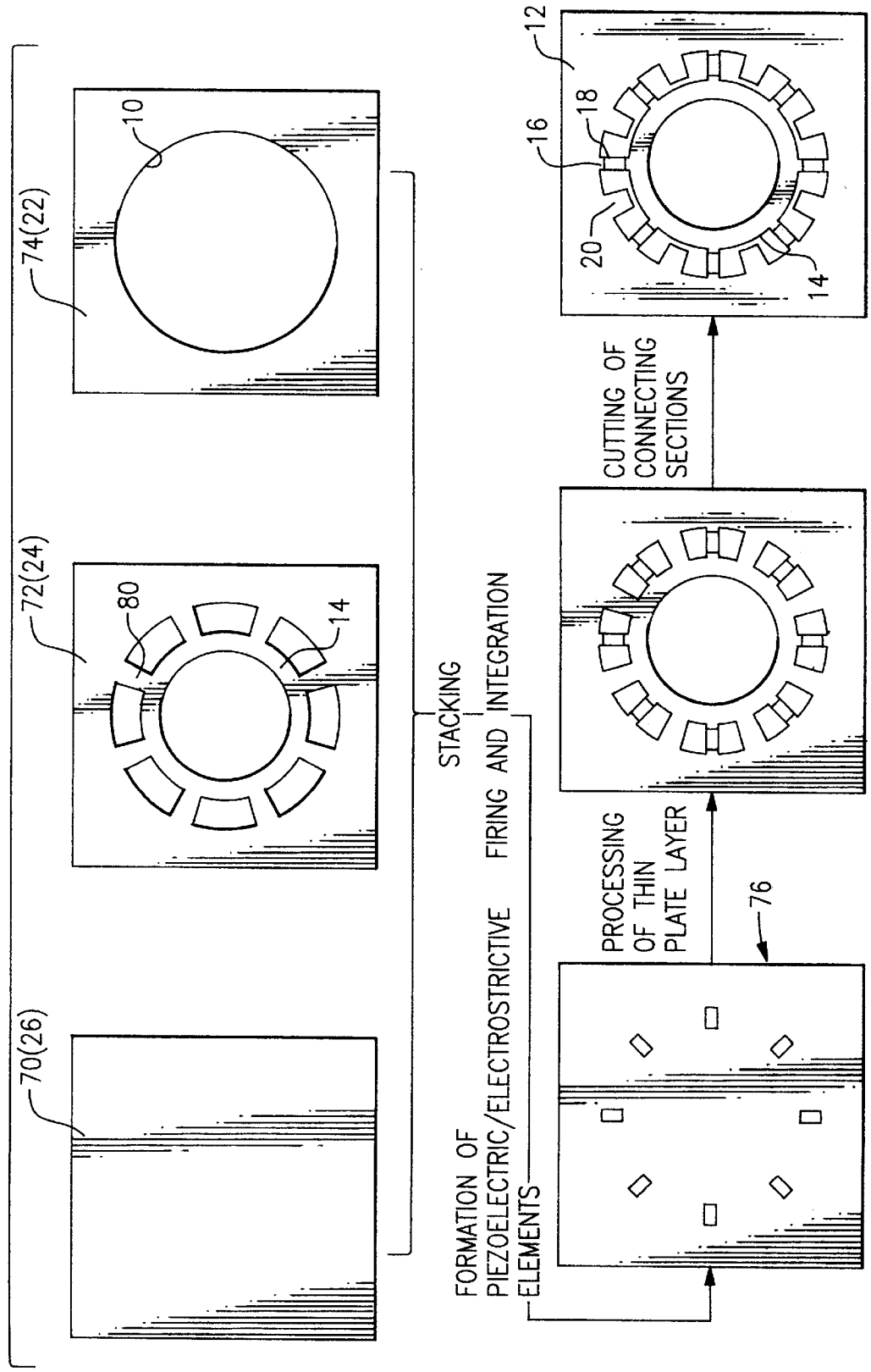
FIG. 29 illustratively shows exemplary production steps for the vibration gyro sensor according to the first embodiment.

Accordingly, as shown in FIG. 29, for example, the following method is preferably adopted. Namely, when the second green sheet 72 is shaped and processed, a plurality of connecting sections 80 are allowed to exist between a portion for forming the annular frame 12 and a portion for forming the annular section 14. After stacking and integration, or after firing and integration, the connecting sections 80 are cut.

The method shown in FIG. 29 is illustrative of one of effective methods for producing the vibration gyro sensor according to the first embodiment shown in FIG. 1. As shown in FIG. 29, the second green sheet 72 for giving the substrate layer 24 is formed and shaped so that the plurality of connecting sections 80 exist between the portion for forming the annular frame 12 and the portion for forming the annular section 14. At this stage, the first green sheet 70 for giving the thin plate layer 26 is not processed into the shape of the thin plate layer 26 at all, which is merely provided as one thin plate having a rectangular configuration. The third green sheet 74 for giving the spacer layer 22 has been processed into the shape corresponding to the shape of the spacer layer 22.

The first, second, and third green sheets 70, 72, 74 are stacked, and then they are fired and integrated into one unit. After that, the piezoelectric/electrostrictive elements 18 are formed in an integrated manner on the predetermined regions on the thin plate layer 26 of the obtained fired product 76 in accordance with the film formation method.

Subsequently, cutting processing is applied to predetermined portions of the thin plate layer 26 of the integrated fired product 76 by means of, for example, laser processing or ultrasonic processing. Thus the resilient sections 16 based on the thin plate layer 26 are formed. Further, the projections 20 are formed by cutting the connecting sections 80 by means of, for example, laser processing or ultrasonic processing. Consequently, the vibration gyro sensor according to the first embodiment shown in FIG. 1 is completed.

The production method shown in FIG. 29 can be also applied to the vibration gyro sensor according to the sixth embodiment and the vibration gyro sensor according to the modified embodiment thereof, in addition to the vibration gyro sensor according to the first embodiment.

In the first to third methods described above, the piezoelectric/electrostrictive elements 18 are formed on the predetermined regions on the thin plate layer 26 as follows.

At first, in order to form the upper electrode 18c, the lower electrode 18a, and the piezoelectric/electrostrictive film 18b on the predetermined regions on the thin plate layer 26, it is possible to appropriately adopt various film formation methods including, for example, thick film methods such as screen printing, application methods such as dipping, and thin film methods such as ion beam, sputtering, vacuum vapor deposition, ion plating, CVD, and plating. However, there is no limitation thereto at all. In order to form the piezoelectric/electrostrictive film 18b, it is preferable to adopt techniques based on, for example, screen printing, dipping, and application.

In the foregoing film formation methods, the film can be formed on the thin plate layer 26 by using a paste or a slurry comprising, as major components, ceramic particles and a metal for constructing the piezoelectric/electrostrictive element 18, in which good operation characteristics can be obtained. When the piezoelectric/electrostrictive element 18 is formed in accordance with the film formation method as described above, the element can be integrated with the thin plate layer 26 without using any adhesive. Accordingly, the use of the film formation method provides such effects that the reliability and the reproducibility are excellent, and it is easy to achieve integration.

The shape of the stacked film for constructing the piezoelectric/electrostrictive element 18 is formed by means of pattern formation by using, for example, the screen printing method and photolithography. Alternatively, the pattern may be formed by removing unnecessary portions by using mechanical processing methods such as laser processing, slicing, and ultrasonic processing.

Figure 30:
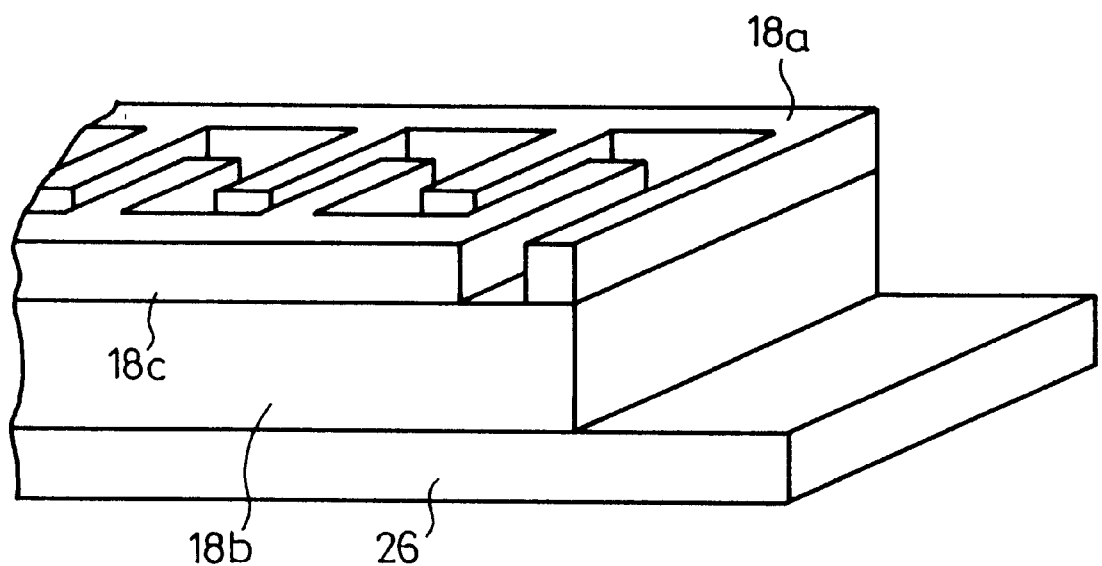
FIG. 30 shows a perspective view, with partial cutaway, illustrating a structure of a piezoelectric/electrostrictive element based on the use of the longitudinal effect of the electric field-induced strain.

The shape of the film and the structure of the piezoelectric/electrostrictive element 18 formed integrally on the predetermined region on the thin plate layer 26 in accordance with the film formation method are not limited at all, to which those hitherto known may be appropriately adopted. For example, other than the structure based on the use of the lateral effect of the electric field-induced strain as shown in FIG. 3, it is possible to appropriately adopt those having a structure based on the use of the longitudinal effect of the electric field-induced strain as shown in FIG. 30. No problem occurs concerning the shape of the film. The shape of the film may be any of polygonal configurations such as triangles and rectangles, circular configurations such as circles, ellipses, and rings, comb-shaped configurations, lattice-shaped configurations, and special configurations obtained by combining the foregoing configurations.

The stacked films 18a, 18b, 18c, which are formed on the thin-walled region 36 (64) given by the thin plate layer 26, may be heat-treated every time when each film is formed so that the integrated structure is established together with the thin-walled region 36 (64). Alternatively, all of the films may be formed to give the stacked films, and then they may be collectively heat-treated so that the respective films may be simultaneously joined with the thin-walled region 36 (64) in an integrated manner. Incidentally, when the electrode film is formed by means of the thin film formation technique, the heat treatment is not necessarily indispensable to achieve integration in some cases.

As for the heat treatment temperature to integrate the stacked films formed on the thin-walled region 36 (64) and the underlying thin-walled region 36 (64), a temperature of about 800° C. to 1400° C. is generally adopted, and preferably, a temperature within a range of 1000° C. to 1400° C. is advantageously selected. When the piezoelectric/electrostrictive film 18b is heat-treated, it is preferable to perform the heat treatment while controlling the atmosphere by using an evaporation source composed of a piezoelectric/electrostrictive material together so that the composition of the piezoelectric/electrostrictive film 18b is not unstable at a high temperature.

The material for the electrode films 18a, 18c for constructing the piezoelectric/electrostrictive element 18 produced in accordance with the foregoing method is not specifically limited provided that the material is a conductor which can withstand the oxidizable atmosphere at a high temperature of a degree of the heat treatment temperature and the firing temperature. For example, the material may be a simple substance of metal or an alloy. The material may be a mixture of a metal or an alloy and an additive such as an insulative ceramic and glass. Further, no problem occurs when the material is a conductive ceramic. More appropriately, it is preferable to use electrode materials comprising major components of high melting point metals such as platinum, palladium, and rhodium, and alloys such as silver-palladium, silver-platinum, and platinum-palladium.

As for the mixture described above, it is desirable to use, as the ceramic to be added to the metal and the alloy, the same material as the material for constructing the thin plate layer 26 (thin-walled region) or the piezoelectric/electrostrictive material described later on. The same material as the material for the thin plate layer 26 is preferably added in an amount of 5 to 30% by volume. The same material as the piezoelectric/electrostrictive material is preferably added in an amount of about 5 to 20% by volume. Namely, the mixture, which is obtained by mixing the metal or the alloy described above with the material for constructing the thin plate layer 26 or the piezoelectric/electrostrictive material, is advantageously used to form the objective electrode film.

The electrodes 18a, 18c, which are formed by using the material as described above, are allowed to have appropriate thicknesses depending on the use or application. As shown in FIG. 3, in the case of the type based on the use of the lateral effect of the electric field-induced strain, the electrode is generally formed to have a thickness of not more than 15 μm, more preferably not more than 5 μm. As shown in FIG. 30, in the case of the type based on the use of the longitudinal effect of the electric field-induced strain, the electrode is appropriately formed to have a thickness of not less than 3 μm, preferably not less than 10 μm, and more preferably not less than 20 μm.

Any material may be used as the piezoelectric/electrostrictive material to give the piezoelectric/electrostrictive film 18b for constructing the driving piezoelectric/electrostrictive elements 18A and the detecting piezoelectric/electrostrictive elements 18B, provided that the material exhibits the electric field-induced strain such as the piezoelectric or electrostrictive effect. The material may be crystalline materials, or amorphous materials. No problem occurs when the material is any of semiconductor materials, dielectric ceramic materials, or ferroelectric ceramic materials. The material may be materials which require the polarization treatment, or materials which do not require the polarization treatment.

Specifically, those preferably used as the piezoelectric/electrostrictive material employed for the vibration gyro sensors according to the first to sixth embodiments include, for example, materials comprising a major component of lead zirconate titanate (PZT system), materials comprising a major component of lead magnesium niobate (PMN system), materials comprising a major component of lead nickel niobate (PNN system), materials comprising a major component of lead zinc niobate, materials comprising a major component of lead manganese niobate, materials comprising a major component of lead antimony stannate, materials comprising a major component of lead titanate, materials comprising a major component of barium titanate, and composite materials thereof. No problem occurs when the material comprising the major component of the PZT system is appropriately added with predetermined additives to give materials, for example, those of the PLZT system containing, as additives, oxides of lanthanum, barium, niobium, zinc, nickel, and manganese, or other types of compounds thereof.

It is desirable that the thickness of the piezoelectric/electrostrictive element 18 constructed as described above is generally not more than 100 μm, preferably not more than 50 μm, and more preferably not more than 30 μm.

It is noted that the following system may be adopted. Namely, the relative arrangement of the driving piezoelectric/electrostrictive elements 18A and the detecting piezoelectric/electrostrictive elements 18B in the vibration gyro sensors according to the first to fourth embodiments is converted into the same relative arrangement as that in the vibration gyro sensor according to the fifth embodiment or the modified embodiment thereof so that the driving vibration characteristics offered by the driving piezoelectric/electrostrictive elements 18A are feedback-controlled to obtain prescribed characteristics while suppressing the vibration based on the Coriolis force.

The present invention has been specifically described above on the basis of the first to sixth embodiments (including the respective modified embodiments). However, the present invention should not be interpreted at all as one which is limited by the foregoing respective embodiments.

It should be understood that various changes, modifications, and improvements may be added to the present invention on the basis of the knowledge of those skilled in the art without deviating from the scope of the present invention.

What is claimed is:

1. A vibration gyro sensor comprising:

an annular section for defining a vibrator, said annular section comprising a first portion having a first thickness and a plurality of second, plate-shaped portions each having a second thickness less than said first thickness, said thicknesses being measured in a direction parallel to an extension of the longitudinal axis of said annular section;

a support member for resiliently supporting said annular section;

a plurality of resilient sections provided between said support member and said annular section, wherein all of said annular section, said support member, and said plurality of resilient sections constitute an integrated fired ceramic product; and piezoelectric/electrostrictive elements formed on said second, plate-shaped portions of said annular section.

2. The vibration gyro sensor according to claim 1, wherein:

said annular section is integrated with element attachment sections which are provided at positions opposite to positions for forming said plurality of resilient sections and which have their principal surfaces parallel to a plane perpendicular to the axis of said annular section, at least a portion of said principal surfaces being used as attachment surfaces for said piezoelectric/electrostrictive elements; and portions of said element attachment sections, on which said piezoelectric/electrostrictive elements are formed, are used as said second plate-shaped portions of said annular section.

3. The vibration gyro sensor according to claim 1, wherein:

said plurality of resilient sections are arranged at positions separated from each other by equal spacing distances and mutually point-symmetry respectively; and said piezoelectric/electrostrictive elements are formed at positions corresponding to positions at which said resilient sections are arranged on said annular section.

4. The vibration gyro sensor according to claim 3, wherein one of two adjacent piezoelectric/electrostrictive elements is a driving piezoelectric/electrostrictive element for vibrating said annular section, and the other is a detecting piezoelectric/electrostrictive element for detecting a strain caused by vibration generated in a direction of 45° with respect to a direction of vibration of said annular section, upon rotation about the axis of said annular section.

5. The vibration gyro sensor according to claim 1, wherein said support member is formed to have an approximately circular planar configuration with an outer diameter which is smaller than an inner diameter of said annular section.

6. The vibration gyro sensor according to claim 1, wherein said support member has an opening having an approximately circular planar configuration with an inner diameter which is larger than an outer diameter of said annular section, and said annular section is supported in said opening through said plurality of resilient sections.

7. The vibration gyro sensor according to claim 1, wherein each of said resilient sections has a contour which is constructed by a ring section having an approximately elliptic planar configuration with its minor axis directed in a radial direction on the basis of a center of said annular section.

8. The vibration gyro sensor according to claim 1, wherein each of said resilient sections has a contour which is constructed by a ring section having an approximately elliptic planar configuration with its major axis directed in a radial direction on the basis of a center of said annular section.

9. The vibration gyro sensor according to claim 1, further comprising piezoelectric/electrostrictive elements formed on said resilent sections.

* * * * *